(12) United States Patent
Shinotsuka

(10) Patent No.: US 7,319,486 B2
(45) Date of Patent: Jan. 15, 2008

(54) HIGH-SPEED EVENT IMAGING DEVICE

(75) Inventor: Sukeyuki Shinotsuka, Sayama (JP)

(73) Assignee: Honda Giken Kogyo K.K., Minato-Ku, Tokyo (JP)

( * ) Notice: Subject to any disclaimer, the term of this patent is extended or adjusted under 35 U.S.C. 154(b) by 513 days.

(21) Appl. No.: 10/489,580

(22) PCT Filed: Jun. 10, 2002

(86) PCT No.: PCT/JP02/05729

§ 371 (c)(1),
(2), (4) Date: Nov. 4, 2004

(87) PCT Pub. No.: WO03/026282

PCT Pub. Date: Mar. 27, 2003

(65) Prior Publication Data

US 2005/0104978 A1    May 19, 2005

(30) Foreign Application Priority Data

Sep. 13, 2001    (JP) .............................. 2001-322869

(51) Int. Cl.
*H04N 5/335* (2006.01)
(52) U.S. Cl. ........................ 348/308; 348/308; 348/294
(58) Field of Classification Search ................ 348/308, 348/602, 745, 294
See application file for complete search history.

(56) References Cited

U.S. PATENT DOCUMENTS

| | | | |
|---|---|---|---|
| 6,365,950 B1 * | 4/2002 | Sohn ........................... | 257/431 |
| 6,730,909 B2 * | 5/2004 | Butler ...................... | 250/338.1 |
| 7,053,947 B2 * | 5/2006 | Sohn .......................... | 348/308 |
| 7,256,378 B2 * | 8/2007 | Furukawa et al. ....... | 250/208.1 |
| 2002/0089611 A1 * | 7/2002 | Kim ........................... | 348/745 |
| 2004/0069929 A1 * | 4/2004 | Furukawa et al. ....... | 250/208.1 |

FOREIGN PATENT DOCUMENTS

JP    2000-329616    * 11/2000

* cited by examiner

*Primary Examiner*—Tuan Ho
*Assistant Examiner*—Asif Khokhar
(74) *Attorney, Agent, or Firm*—Fulbright & Jaworski

(57) ABSTRACT

A high speed video camera capable of taking video of a high speed phenomena by an image sensor composed of a matrix of MOS type light sensor circuits each representing a unit pixel and having a wide dynamic range with no occurrence of afterglow, recording the video by storing image data output from the image sensor, executing compensation of outputs of the image sensor based on the image data read from the memory at a normal processing speed and displaying the video based on the compensated video data on a display device. Accordingly, with this camera, it is possible for the user to take and record video of a high speed phenomenon at a very high speed while executing compensation for variations in outputs of the image sensor at a normal processing speed based on the video data read from the memory.

2 Claims, 23 Drawing Sheets

HIGH-SPEED EVENT IMAGING DEVICE

BACKGROUND OF THE INVENTION

The present invention relates to a high-speed video camera capable of taking images of high speed phenomena, storing data of the images on a memory and reproducing the images based on the image data stored on the memory.

If a conventional video camera is used for taking video of a high-speed phenomenon that may unexpectedly occur and does not allow the user to preset optimal photographing conditions, it cannot capture the subject in time with its automatic diaphragm, resulting in viewing fuzzy video with considerable afterglow of pixels therein on a display screen.

In recent years, there has been developed an image sensor comprising a matrix of MOS type light sensor circuits each representing a unit pixel, which has a wide dynamic range suitable for capturing high speed phenomena to visualize with least occurrence of afterglow of pixels.

Japanese Laid-Open Patent Publication No. 2000-329616 discloses an image sensor using a number of light sensor circuits each representing a unit pixel, which circuit comprises, as shown in FIG. 1, a photo-diode PD operating as a photoelectric converting element for producing a sensor current proportional to the quantity of incident light Ls falling thereon, a transistor Q1 having a logarithmic output characteristic in a weak inverse state for converting the sensor current produced in the photodiode into a voltage signal Vpd, a transistor Q2 for amplifying the voltage signal Vpd and a transistor Q3 for outputting a sensor signal in accordance with a timing pulse Vs and which circuit is characterized by its wide dynamic range, thereby achieving the high sensitivity of detecting a light signal. In addition, the light sensor circuit is provided with a means for changing a drain voltage VD of the transistor Q1 to a value lower than a normal value for a specified period to remove a charge accumulated in a parasitic capacitor C of the photodiode PD to initialize the circuit. The light sensor circuit can thus obtain a voltage signal Vpd corresponding to the quantity of incident light Ls even if the sensor current absurdly changed, thereby eliminating the possibility of occurrence of afterglow of the pixel even at a small quantity of incident light.

However, the conventional image sensor using the above-described light sensor circuits cannot be free from structure-derived variations in output characteristics as well as variations in temperature characteristics of pixel signals. In other words, both kinds of the variations shall be compensated for, otherwise, dark-current and bright-current image data cannot be obtained when taking images. The compensation of the image sensor for variations in its output characteristics may be carried out by performing operations referring to a table containing compensating values predetermined based on the measured variations of every sensor circuit. In the case when the conventional image sensor is used for taking an image from a high speed phenomenon by temporally storing obtained image data on a high speed memory and displaying the data on a display screen, it is needed to promptly compensate the image data for variations in output characteristics of respective pixels before storing the image data on the high speed memory. However, it is very difficult to provide the image sensor with a compensating circuit capable of compensating pixel outputs of the image sensor in time at a speed high enough to follow the high speed phenomenon.

Thus, when a high speed subject is captured, fast stored and displayed by the conventional image sensor using a matrix of MOS type light sensor circuits (pixels) having a wide dynamic range with least occurrence of afterglow of pixels, there still arises a problem that it is almost impossible to compensate the image sensor for variations in output characteristics of respective pixels before storing data of the captured image on a memory by following the high speed phenomenon.

Furthermore, when displaying an image taken from the high speed phenomenon being captured by the image sensor in order to monitor the state of taking video thereof, there may be such a problem that the frame rate of the image sensor exceeds the reproducing speed of the display device which in this case cannot display the image.

SUMMARY OF THE INVENTION

An object of the present invention is to provide a high speed video camera capable of taking video of high speed phenomena by using a high-speed image sensor composed of a number of MOS type light sensor circuits, each representing a unit pixel and possessing a wide dynamic range not to cause afterglow of pixels, by which image data is temporally stored on a high speed memory and displaying a video signal on a display screen, wherein, in order to easily realize compensation for variations in output characteristics of the image sensor, image data output from the image sensor is directly stored on the high speed memory and then compensated for variations in output characteristics of respective pixels based on the image data stored and readout from the memory, and an image sensor signal is reproduced based on the compensated image data and displayed on the display screen.

Another object of the present invention is to provide a high speed video camera provided with a separate memory for storing image data on a captured high speed phenomenon at a framing rate adapted to that of a monitor display device, which is thus capable of reading the image data from the memory, compensating for variations in output characteristics of respective light sensor outputs of the image sensor and presenting an image signal of the high speed phenomenon based on the compensated image data on a monitoring screen of the display device.

PREFERRED EMBODIMENTS OF THE PRESENT INVENTION

Figure 1:
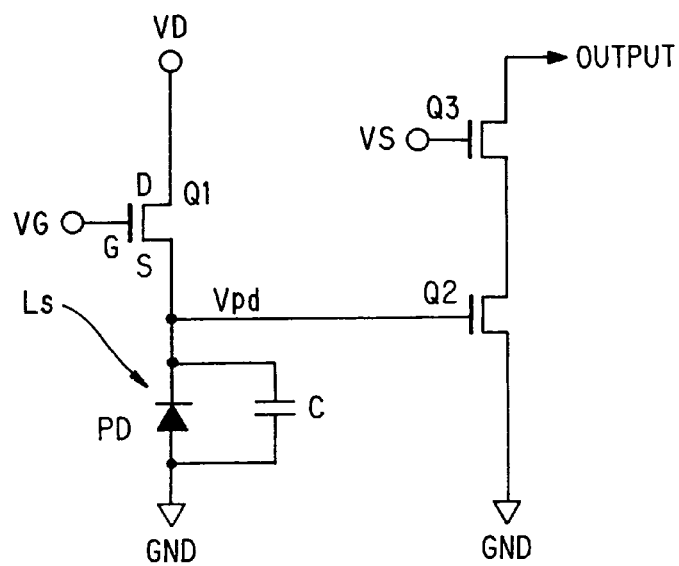
FIG. 1 is an electric circuit diagram of a light sensor circuit for one pixel, which is used as a unit component of an image sensor of a high speed video camera according to the present invention.

An image sensor used for a high speed video camera according to the present invention uses as a unit pixel a light sensor circuit illustrated in FIG. 1.

Figure 2:
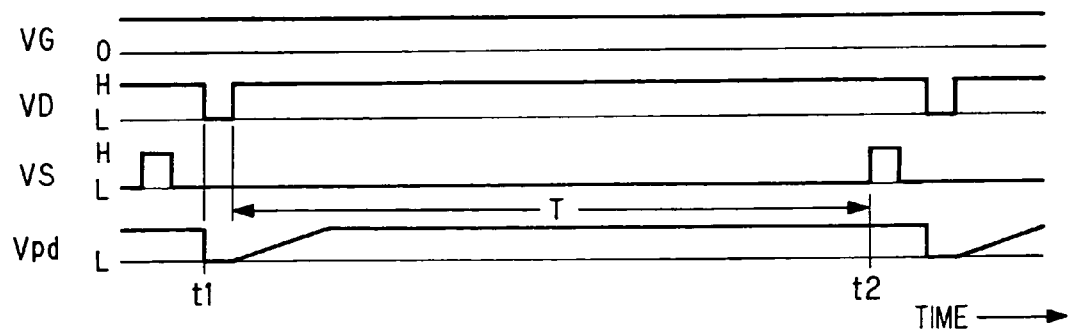
FIG. 2 is a time chart of signals to be generated at respective portions of the light sensor circuit of FIG. 1.

FIG. 2 shows a time chart of signals produced at various portions of the light sensor circuit. In FIG. 2, t1 is an initializing timing pulse and t2 is a light-signal detection timing pulse. T designates a period for accumulating a charge in a parasitic capacitor C of the photodiode PD.

Figure 3:
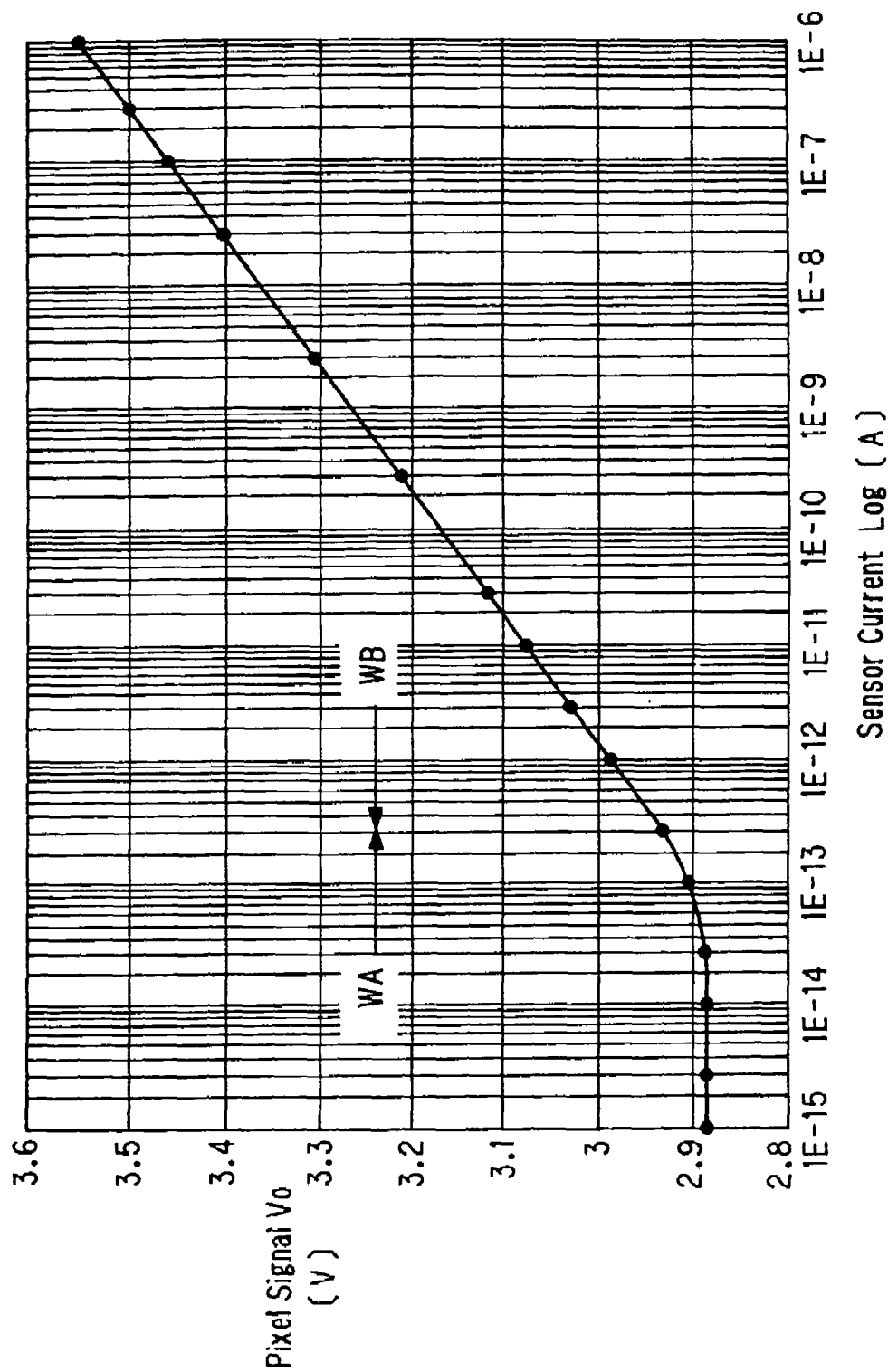
FIG. 3 shows a characteristic of a pixel output signal versus a light sensor current of FIG. 1.

The light sensor circuit, as illustrated in FIG. 3, has a logarithmic output characteristic with a sufficient sensor current produced in a photodiode PD, i.e., a sufficient quantity of light falling thereon, but has a non-logarithmic (almost linear) output characteristic with a small current in the photodiode due to a response lag caused in charging a parasitic capacitor of the photodiode PD. In FIG. 3, WA designates a non-logarithmic response region and WB designates a logarithmic response region.

Figure 4:
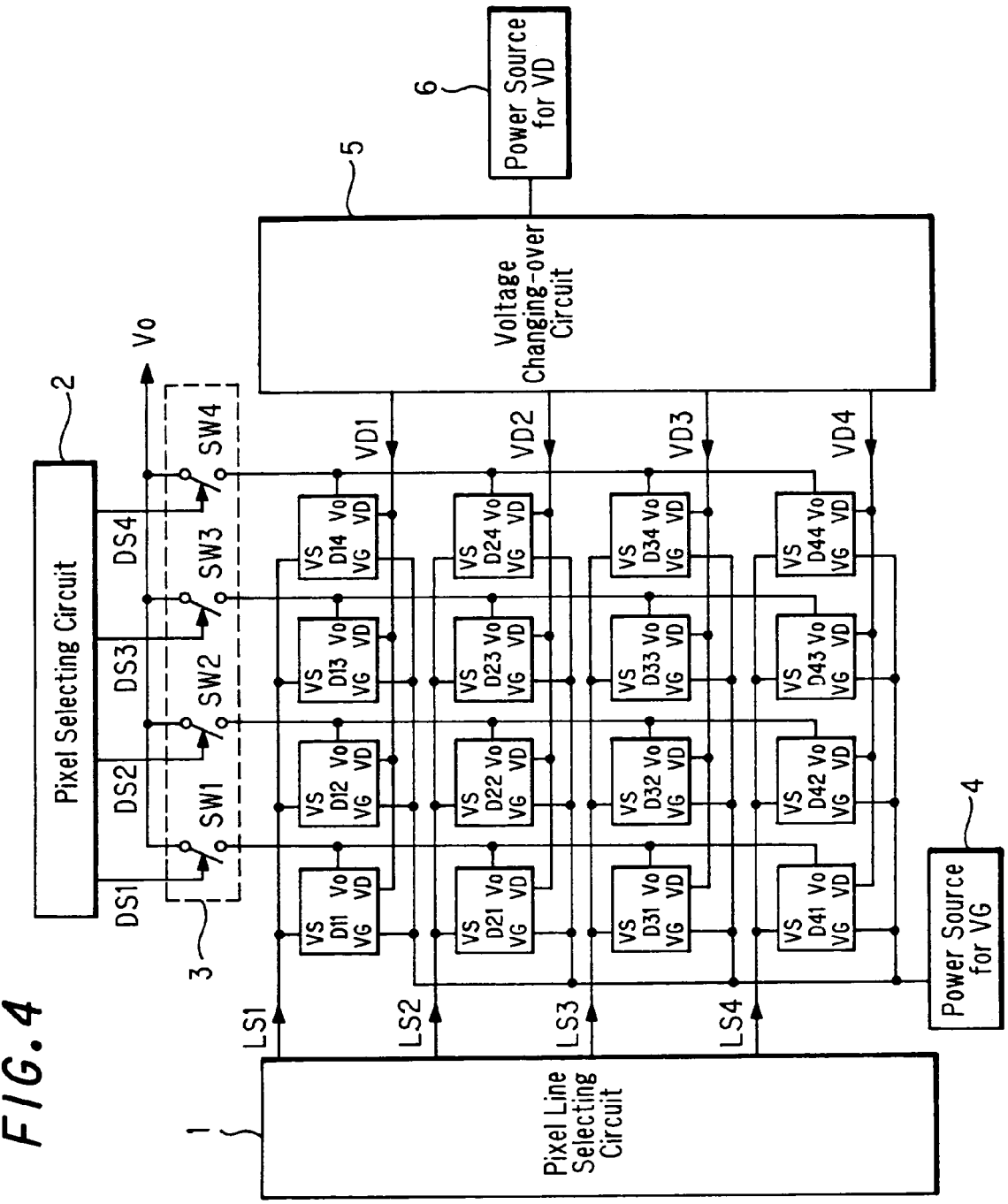
FIG. 4 is a basic block diagram of an image sensor.

FIG. 4 shows an exemplary construction of an image sensor consisting of a number of the light sensor circuits (FIG. 1) arranged to form a matrix of pixels, wherein sensor signals from respective pixels are read by scanning in a time series and the pixels can be initialized at timing adapted to the readout-scanning of respective sensor signals.

The image sensor is composed of, for example, 4×4 pixels D11~D44 arranged in a matrix of pixel circuits, in which pixel lines are selected one by one with respective selecting signals LS1~LS4 successively output from a pixel line selecting circuit 1 and pixels in each selected pixel line are readout one by one as respective sensor signals in such a manner that selecting signals DS1~DS4 successively output from a pixel selecting circuit 2 turn on corresponding switches SW1~SW4 (in a group 3) to read respective pixel signals Vo in a time series. In FIG. 4, numeral 4 designates a power source for gate voltage VG of the transistor Q1 and numeral 6 designates a power source for a drain voltage VD of the transistor Q1.

The image sensor is provided with a voltage switching-over circuit 5 by which a drain voltage VD of each transistor Q1 for each pixel is changed from a normal high-level H to an initializing lower level L and reverse by the effect of specified timing pulses when selecting each line of pixels.

Figure 5:
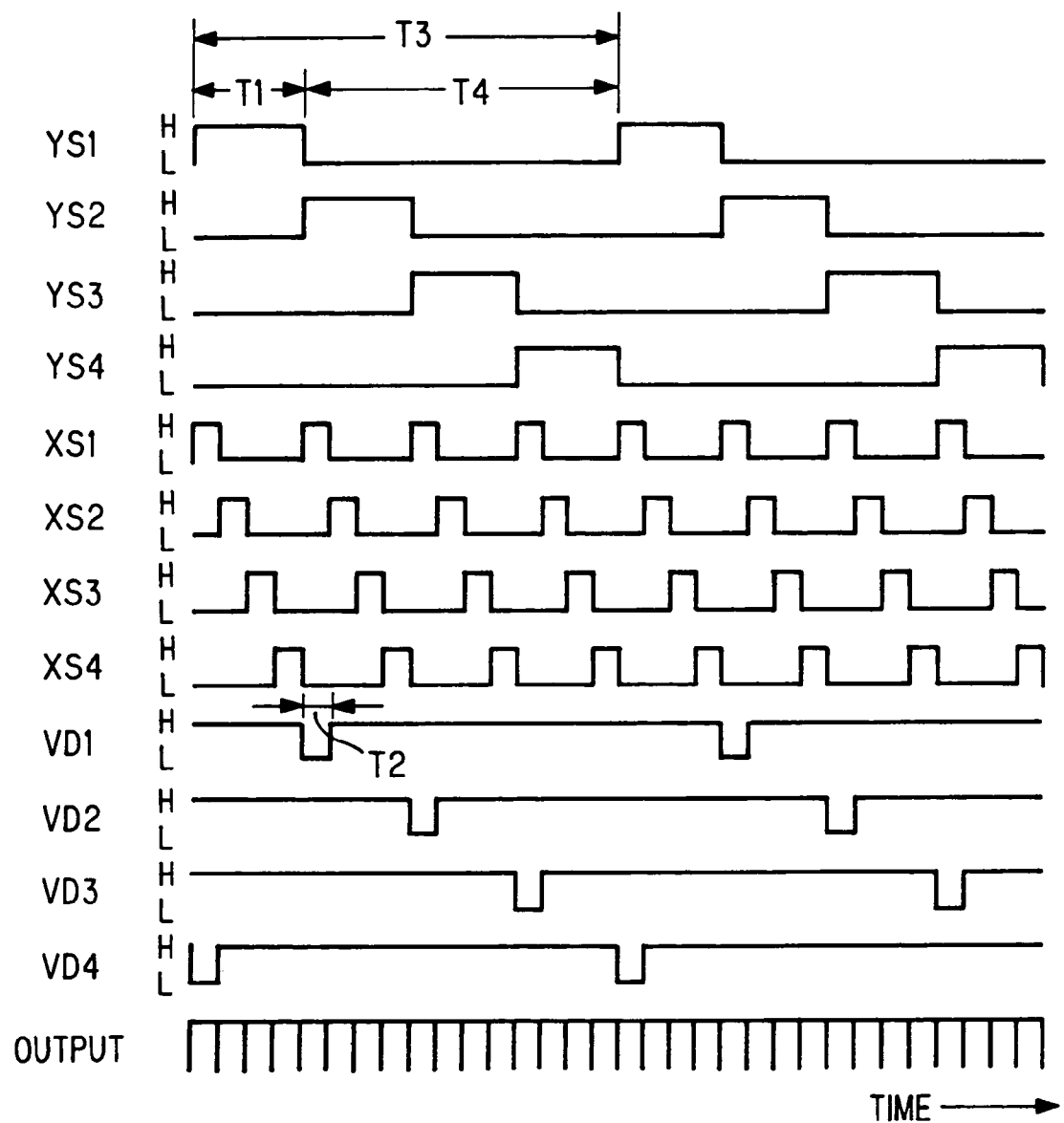
FIG. 5 is a time chart of signals to be generated at respective portions of the image sensor of FIG. 4.

FIG. 5 shows a time chart of signals generated at respective portions of the above-described image sensor during the operation of the image sensor.

The above-described construction of the image sensor is the same as that of the conventional image sensor described before.

In the thus constructed image sensor, a sensor current corresponding to a quantity of light falling on each sensor circuit is converted into a voltage by a transistor Q1 by using its sub-threshold region characteristic. However, respective sensor circuits have respective sub-threshold values which may be different from each other and therefore may cause variations in pixel output characteristics of the image sensor. In addition, the amplifying transistors Q2 provided for amplifying voltage signals received with high impedance from corresponding transistors Q1 to output amplified voltage signals may be different in their characteristics, which may also cause variations in pixel output characteristics of the image sensor.

Furthermore, the image sensor cannot be free from variations in temperature characteristics of light sensor circuits.

Figure 6:
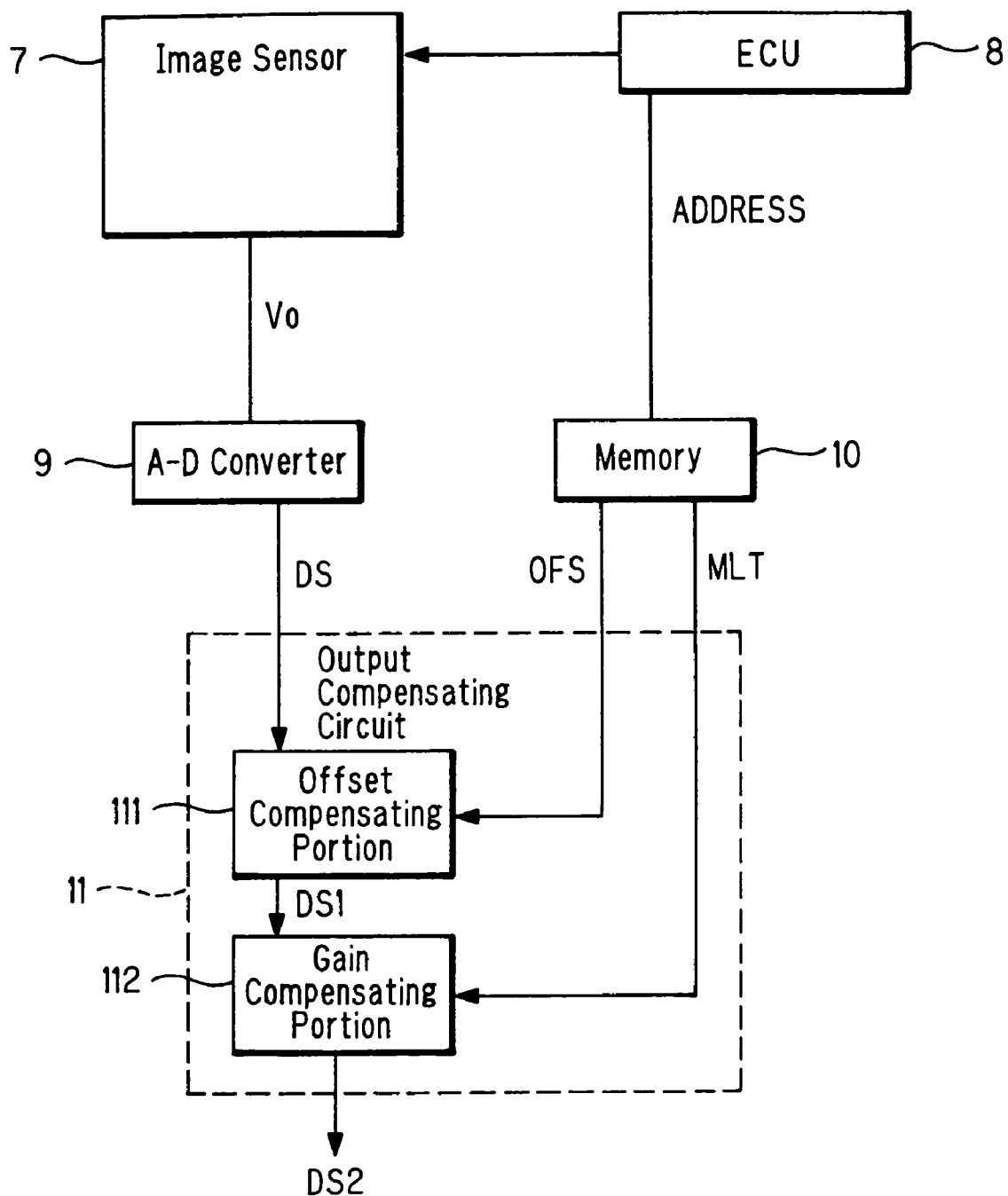
FIG. 6 is a block diagram showing an exemplary construction of an output compensating device for compensating for variations in output characteristics of an image sensor.

FIG. 6 shows a basic construction of an output compensating system for conducting offset and gain compensations for variations in output characteristics of pixel signals, which variations were derived from the structures of corresponding light sensor circuits.

This system comprises an image sensor 7, an ECU 8 for controlling the operation for reading pixel signals in a time series, an A-D converter 9 for converting pixel signals Vo outputted in a time series from the image sensor 7 into corresponding digital signals, a memory 10 for storing offset compensation values OFS predetermined for output characteristics of pixels (light sensor circuits) and multipliers MLT for gain compensation, both of which can be selected in accordance with an address signal ADDRESS (X, Y) of a pixel to be processed, and an output compensating circuit 11 for performing arithmetic operations necessary for the offset and gain compensations of the digitized pixel signals by using corresponding offset compensation values OFS and multipliers MLT read from the memory 10.

Figure 8:
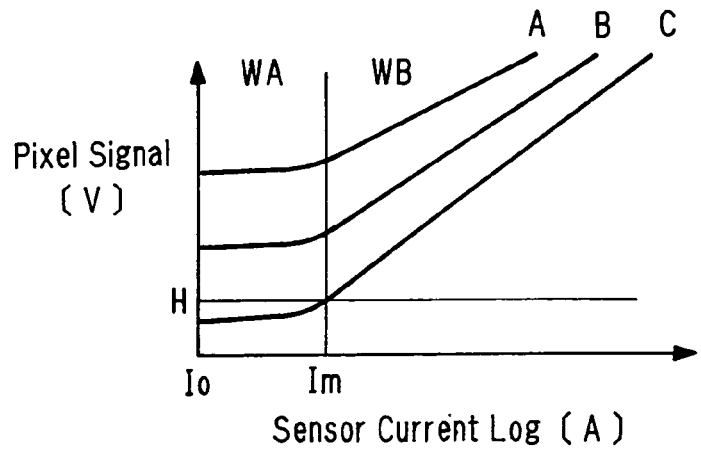
FIG. 8 shows exemplary variations in output characteristics of pixel signals from the image sensor, which variations were derived from the structure of respective light sensor circuits of the image sensor.

FIG. 8 shows an example of different output characteristics of three pixel signals A, B and C which differences were caused from the structure-derived variations in the output characteristics of corresponding light sensor circuits. In the shown example, a sensor current value Im corresponding to a threshold H of a pixel output represents a point at which characteristics of pixel signals A, B and C change from a non-logarithmic response region to a logarithmic response region. Io designates a dark current in a sensor when it is not illuminated.

According to the present invention, the compensation of outputs of the image sensor is normally conducted when the output characteristics of respective pixel signals are substantially the same in shape in the non-logarithmic response region WA but they are different by gradient from each other in the logarithmic response region WB. Parameters for each pixel signal are information about the point at which its characteristic changes from the non-logarithmic response region WA to the logarithmic response region WB and a pixel output appearing at a dark sensor current.

Figure 7:
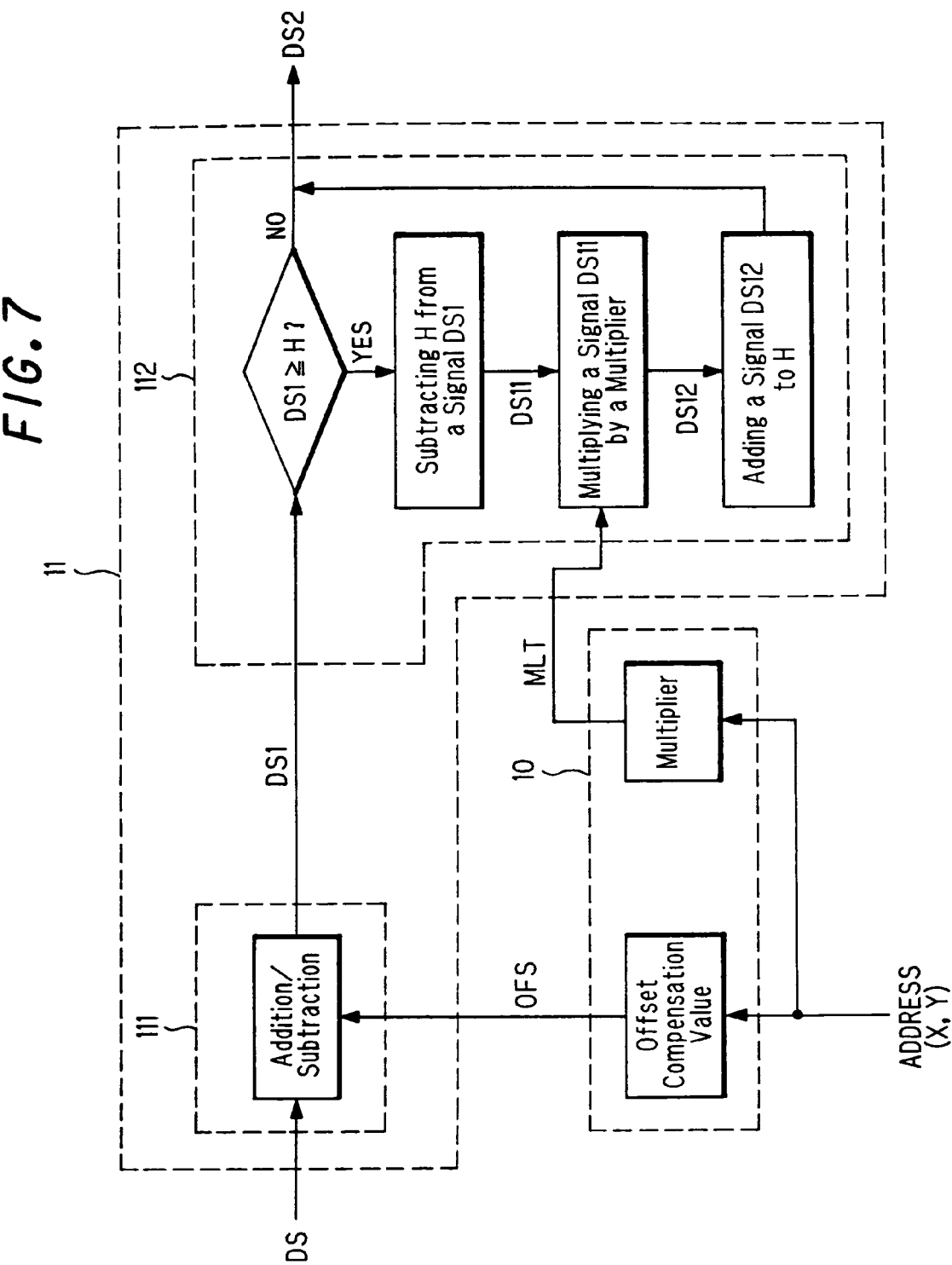
FIG. 7 is a flowchart depicting the operation of the output compensating device of FIG. 6.

FIG. 7 illustrates the operation of the output compensating circuit 11.

Figure 9:
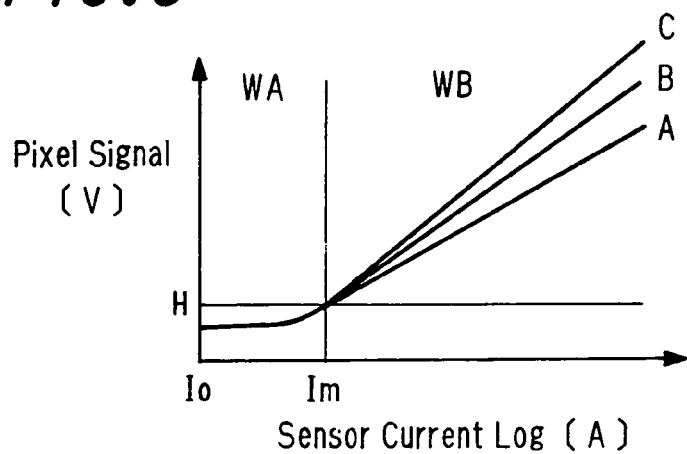
FIG. 9 shows output characteristics of pixel signals, which were obtained by offset compensation of the signals having the output characteristics shown in FIG. 8.

In the memory 10, there is a table of offset compensation values OFS for correcting outputs of respective pixel signals so as to attain a value H at a sensor current of Im. In an offset compensating portion 111, the digitized pixel signals DS are corrected by arithmetic operations (addition, subtraction) using corresponding offset compensation values OFS. As the result of the offset compensation, three pixel signals (A, B and C) have the same characteristic in the non-logarithmic response region WA as shown in FIG. 9.

In a gain compensating portion 112, the gain compensation of output characteristics of three pixel signals in the logarithmic response region WB above the threshold value H is conducted by arithmetic operations (multiplication) using corresponding multipliers based on the offset-compensated signals DS1.

In practice, the offset-compensated pixel signal DS1 is checked whether it is greater than the threshold value H and, if so (i.e., the signal is in the logarithmic region WB), it is further subjected to gain compensation by the following arithmetic operations using a specified multiplier MLT read from the memory 10.

Output←H+(Pixel Signal DS1−H)×Multiplier

A result signal is output as an output-compensated pixel signal DS2.

Figure 10:
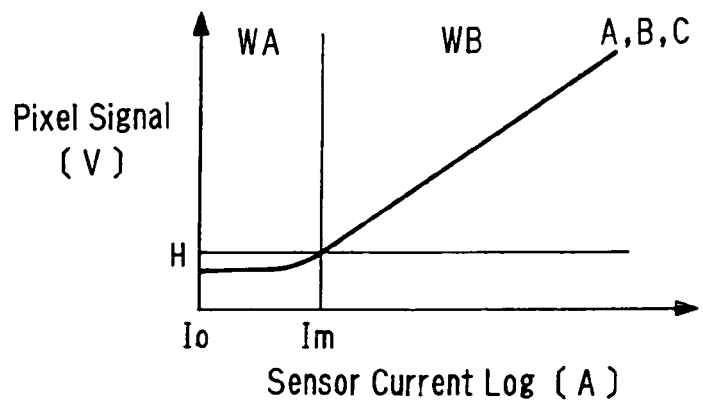
FIG. 10 shows output characteristics of pixel signals, which were obtained by offset and gain compensations of the signals having the output characteristics shown in FIG. 8.

As the result of the above-described gain compensation, three pixel signals A, B and C have the same characteristics in the logarithmic response region WB as shown in FIG. 10. In this instance, the offset-compensated pixel signal DS1 being smaller than the threshold value (i.e., in the non-logarithmic response region WA) is directly output as an output-compensated digital pixel signal DS2.

Figure 11:
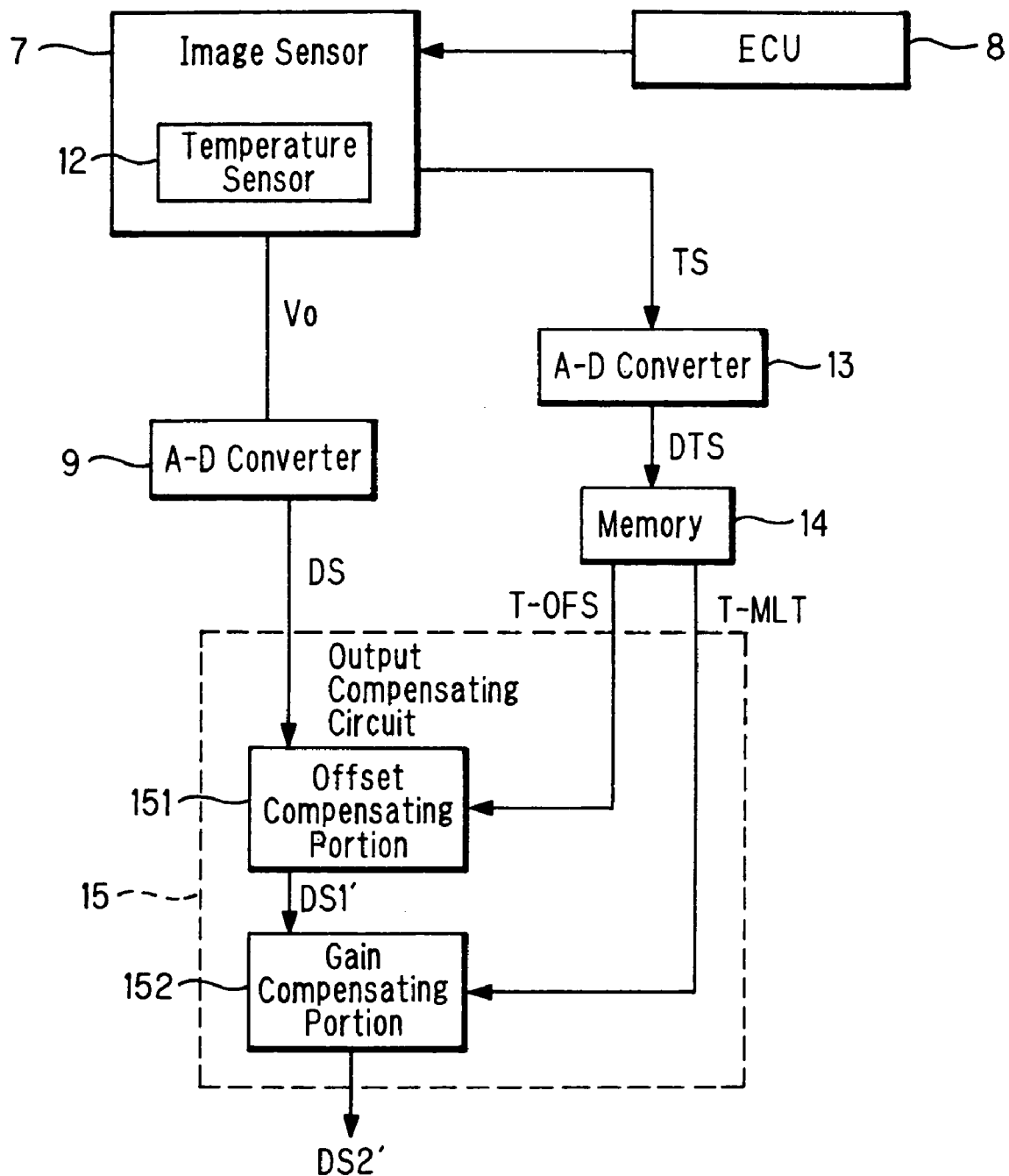
FIG. 11 is a block diagram showing another exemplary construction of an output compensating device for compensating for variations in output characteristics of pixel signals from an image sensor, which variations were derived from variations in temperature characteristics of respective light sensor circuits of the image sensor.

FIG. 11 shows a basic construction of a system for compensating pixel signals for offset values and gain levels, which differences were resulted from variations in temperature characteristics of corresponding pixel circuits.

The system comprises an image sensor 7 incorporating a temperature sensor 12, an ECU 8 for performing the control of reading pixel signals Vo from respective pixel circuits in a time series and temperature detection signals TS from the temperature sensor 12 at a specified timing, an A-D converter 9 for converting pixel signals Vo output in a time series from the image sensor 7 into corresponding digital signals, an A-D converter 13 for converting the temperature detection signals TS read from the temperature sensor 12 into corresponding digital signals, a memory 14 for storing offset compensation values T-OFS predetermined for temperature characteristics of respective pixel circuits and multipliers T-MLT for gain compensation, which values can be selected in accordance with the digitized temperature detection signal DTS, and an output compensating circuit 15 for performing arithmetic operations necessary for the offset compensation and gain compensation of the digitized pixel signal using a corresponding offset compensation value OFS and multiplier MLT read from the memory 14.

Figure 13:
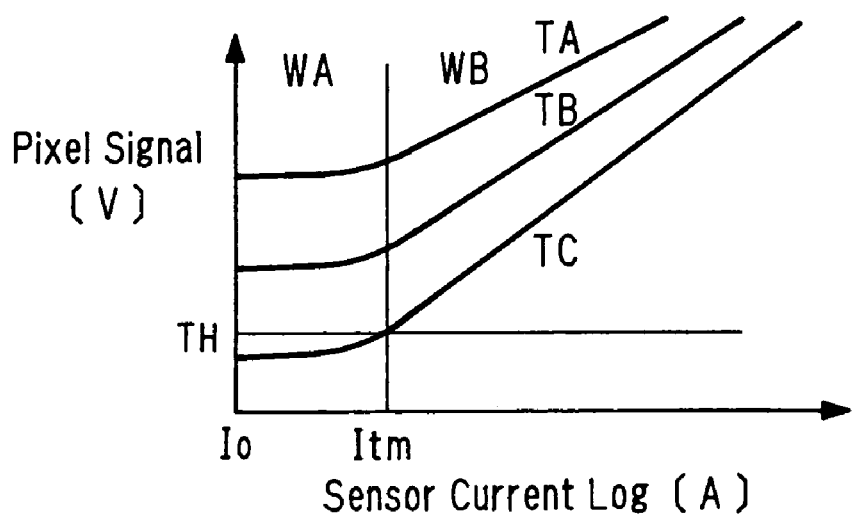
FIG. 13 shows an example of variations in output characteristics of pixel signals from an image sensor, which variations were derived from variations in temperature characteristics of respective light sensor circuits of the image sensor.

FIG. 13 shows exemplary variations in output characteristics of respective pixel signals TA, TB and TC in accordance with temperatures. In the shown example, a sensor current value Itm corresponding to a pixel output threshold TH represents a point at which pixel signals TA, TB and TC, corresponding to temperatures, change from a non-logarithmic response region WA to a logarithmic response region WB. Io designates a dark current in a sensor when it is not illuminated.

According to the present invention, the compensation of outputs of the image sensor is normally conducted when the output characteristics of respective pixel signals have the substantially same shape in the non-logarithmic response region WA but they are different by gradient from each other in the logarithmic response region WB. Parameters for the pixel signals are information about the point at which characteristics of pixel signals corresponding to the temperatures (TA, TB and TC) change from the non-logarithmic response region WA to the logarithmic response region WB and the pixel output with a dark sensor current.

Figure 12:
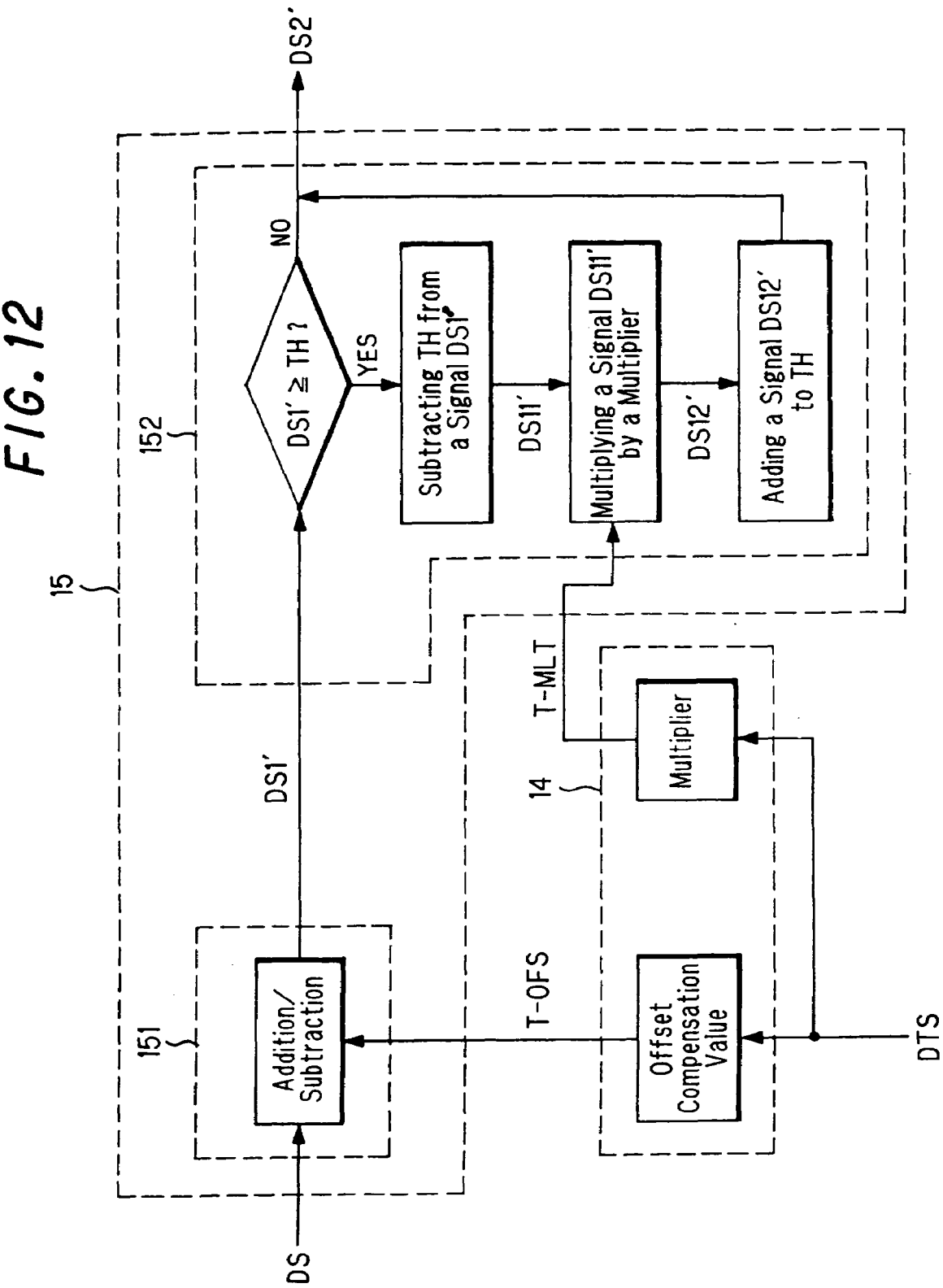
FIG. 12 is a flowchart depicting the operation of the output compensating device of FIG. 11.

FIG. 12 illustrates the operation of the output compensating circuit 15.

Figure 14:
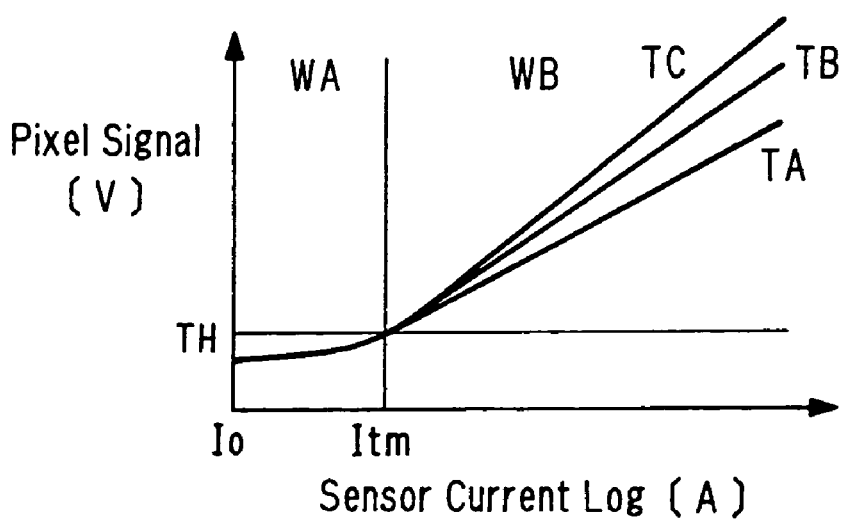
FIG. 14 shows output characteristics of pixel signals, which were obtained by offset compensation of temperature characteristics of the signals having the output characteristics shown in FIG. 13.

In the memory 14, an offset compensation value T-OFS for obtaining the pixel output of the threshold value TH at the sensor current of Itm. In an offset compensating portion 151, the digitized pixel signals DS are processed by arithmetic operations (addition, subtraction) using the offset compensation value T-OFS. As the result of the offset compensation, three pixel signals TA, TB and TC, corresponding to the temperatures, have the same characteristics in the non-logarithmic response region WA as shown in FIG. 14.

In a gain compensating portion 152, the gain compensation of characteristics of the pixel signals in the logarithmic response region WB above the threshold value TH is conducted by arithmetic operations (multiplication) using a corresponding multiplier and the offset compensated signal DS1'.

In practice, the offset-compensated pixel signal DS1' is checked whether it is greater than the threshold value TH and, if so, it is further subjected to gain compensation by conducting the following arithmetic operations using a specified multiplier T-MLT selected from the memory 14.

Output←TH+(Pixel Signal DS1'−TH)×Multiplier

A result signal is outputted as an output-compensated digital pixel signal DS2'.

Figure 15:
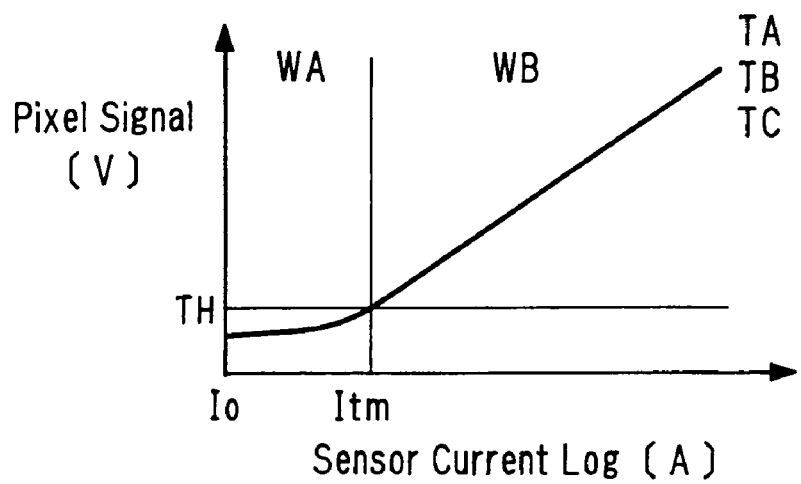
FIG. 15 shows output characteristics of pixel signals, which were obtained by offset compensation and gain compensation of temperature characteristics of the signals having the output characteristics shown in FIG. 13.

As the result of the gain compensation, three pixel signals TA, TB and TC, with corresponding temperatures, have the same characteristic in the logarithmic response region WB as shown in FIG. 15. In this instance, the offset-compensated pixel signal DS1' being smaller than the threshold value TH is directly outputted as an output-compensated digital pixel signal DS2'.

The output compensating device for the image sensor according to the present invention conducts the offset and gain compensations for variations in the output characteristics of pixel signals, which variations were resulted from the structures of pixel circuits, and the offset and gain compensations for variations in the temperature characteristics of the same pixel signals so that the pixel signals of the image sensor are free from the effects of both kinds of characteristic variations of the pixel circuits can be obtained.

Figure 16:
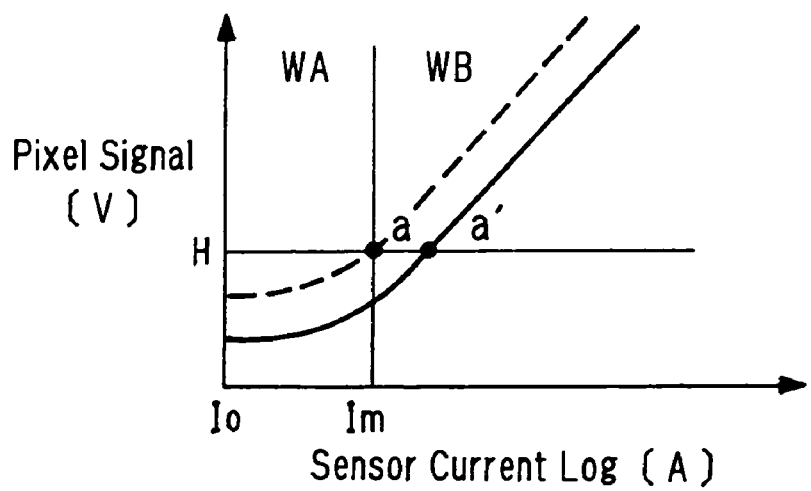
FIG. 16 shows two output characteristics of pixel signals, one of which is obtained with no effect of a temperature offset and other is obtained with an effect of a temperature offset.

If a pixel signal affected by both kinds of the characteristic variations was compensated first for variations in output characteristics by the offset and gain compensations according to the method shown in FIG. 7 and then compensated for variations in temperature characteristics by the offset and gain compensations according to the method shown in FIG. 12, the compensated pixel signal may not completely be corrected because the above compensation was made without compensation for the variation caused by a change in temperature. In other words, conducting the offset and gain compensations of the pixel signal for the structure-derived variation in its output characteristic in respective regions with a boundary of a threshold level H, no problem may arise as far as the pixel signal is not subjected to the effect of a change in temperature as shown by a dot line in FIG. 16. However, if the signal was subjected to a temperature offset as shown by a solid line in FIG. 16, the compensation region boundary point is shifted from "a" to "a'" since the level H is fixed. As the result, the compensation was made in the different irregular way. In the shown case, the output characteristic of the pixel signal is shifted downward, resulting in shifting the level H above the boundary between the non-logarithmic response region WA and the logarithmic response region WB.

The above-described problem can be solved by the present invention in such a manner that the level H is aligned with the boundary between the non-logarithmic response region WA and the logarithmic response region WB by conducting the offset compensation for variations in temperature characteristics of respective pixel signals before conducting the offset and gain compensations for structure-derived variations in output characteristics of the pixel signals.

The same kind of problem may arise when conducting the offset and gain compensations for variations in temperature characteristics and then the offset and gain compensations for structure-derived variations in output characteristics of respective pixel signals. In this case, the level TH is aligned with the boundary between the non-logarithmic response region WA and the logarithmic response region WB by conducting the offset compensation for the structure-derived variation in the output characteristics of each pixel signal before conducting the offset compensation for the variation in temperature characteristic of each pixel signal.

Figure 17:
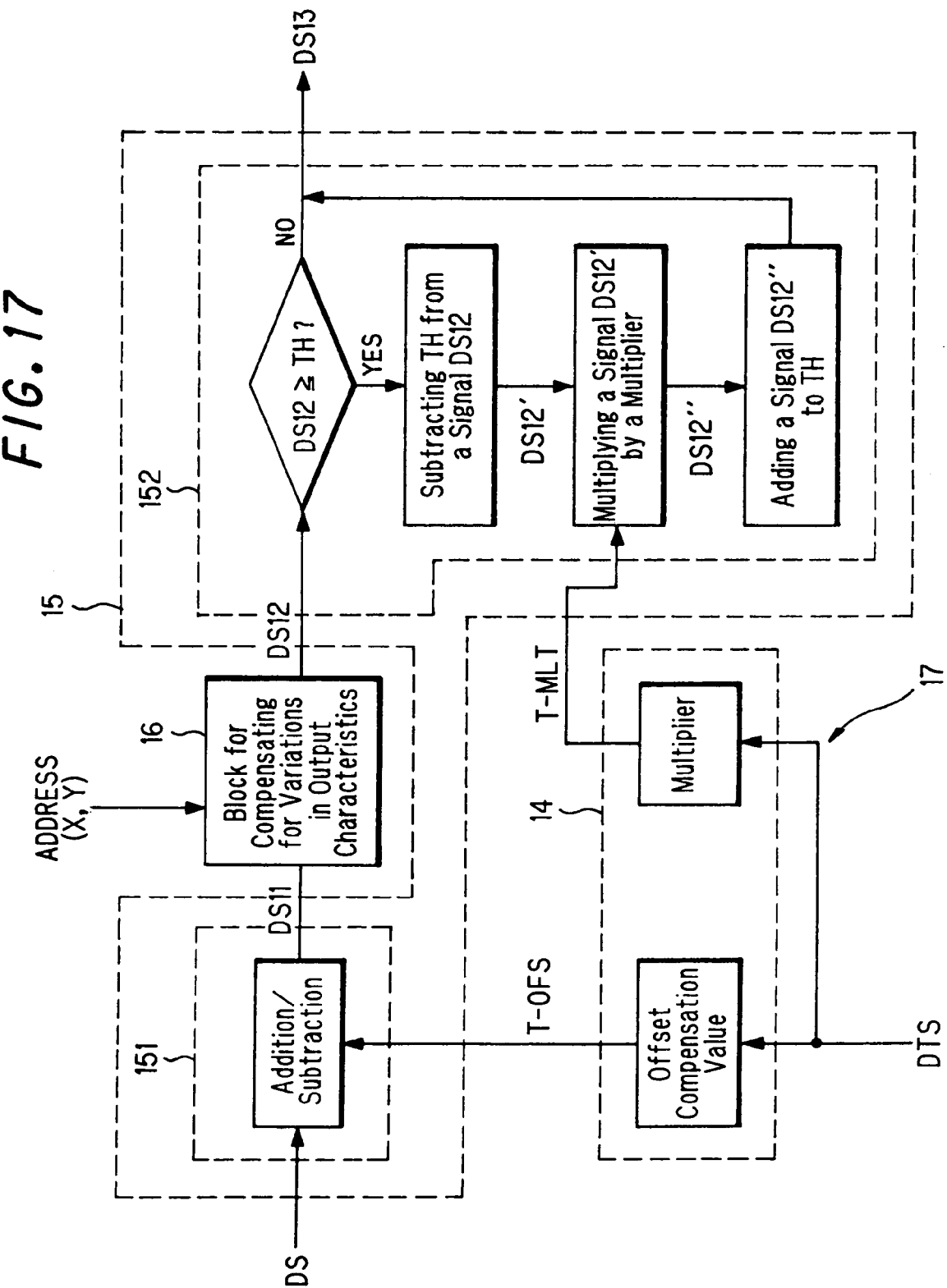
FIG. 17 is a flowchart depicting the operation of the output compensating device for compensating for variations in output characteristics of an image sensor, which variations were derived from variations in output characteristics and temperature characteristics of respective light sensor circuits of the image sensor.

FIG. 17 shows a procedure for conducting the offset compensation of each pixel signal for a variation in temperature characteristic, the offset and gain compensation for a structure-derived variation in output characteristic and then the offset and gain compensation for a variation in temperature characteristic.

In FIG. 17, a block 16 is similar to the processing block 112 shown in FIG. 7 for conducting the offset and gain compensation for a variation in the output characteristic of each pixel signal, and a block 17 is similar to the processing block 14 shown in FIG. 12 for conducting the offset and gain compensation for a variation in the temperature characteristic of each pixel circuit. In this case, a pixel signal DS from the image sensor 7 is digitized and transferred to an offset compensation block 151 on the side of the temperature characteristic compensation block 17, whereby the pixel signal DS is subjected to the offset compensation for its temperature characteristic variation to attain a correct level H necessary for compensating for the output characteristic variation of the pixel signal. The offset-compensated pixel signal DS11 is then transferred to the processing block 16, whereby it is suitably compensated for a variation in its output characteristic by the offset and gain compensations. The offset- and gain-compensated pixel signal DS12 from the block 16 is then transferred to a gain compensation block 152 on the side of processing block 17, whereby the signal is compensated by the gain compensation for its temperature characteristic variation. Finally, the pixel signal DS13 compensated for variations in output and temperature characteristics is obtained.

Figure 18:
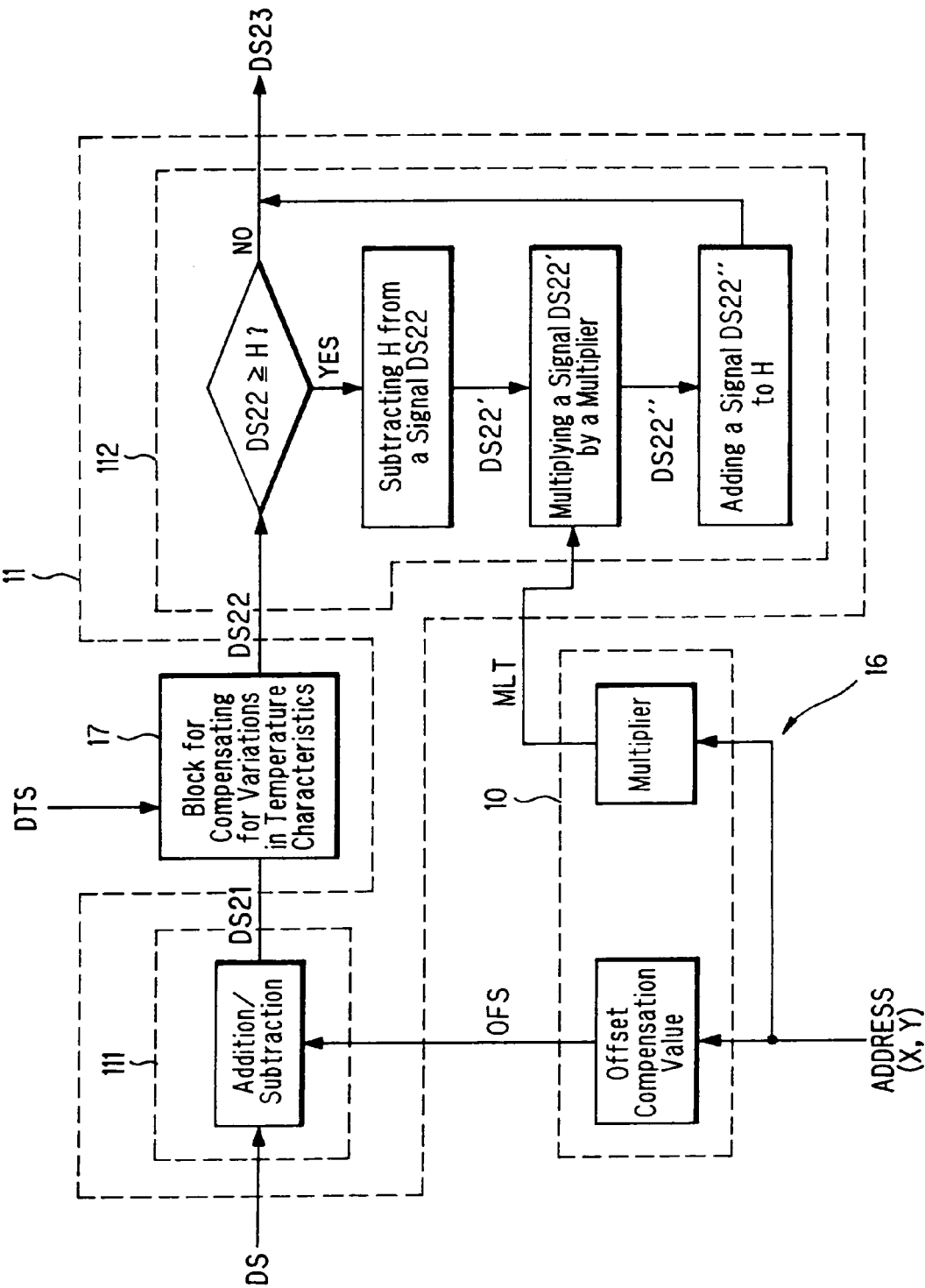
FIG. 18 is an another exemplary flowchart depicting the operation of the output compensating device for compensating for variations in output characteristics of an image sensor, which variations were derived from variations in output characteristics and temperature characteristics of respective light sensor circuits of the image sensor.

FIG. 18 shows a procedure of compensation operations by conducting the offset compensation for a structure-derived variation in the output characteristic of a pixel signal, the offset and gain compensations for a variation in its temperature characteristic and then the offset and gain compensations for a variation in its output characteristic.

In this instance, a pixel signal DS from the image sensor 7 is digitized and transferred to an offset compensation block 111 on the side of the output characteristic variation compensation block 16, whereby the pixel signal is subjected to the offset compensation for a variation in its output characteristic to attain a correct level TH necessary for compensating the variation in the temperature characteristic of the pixel signal. The offset-compensated pixel signal DS21 is transferred to the processing block 17, whereby it is compensated for its temperature characteristic variation by the offset and gain compensations. The compensated pixel signal DS22 from the block 17 is transferred to a gain compensation block 112 on the side of processing block 16, whereby the signal is subjected to the gain compensation for its output characteristic variation. This process produces a pixel signal DS23 compensated for the variations in both output and temperature characteristics.

Figure 20:
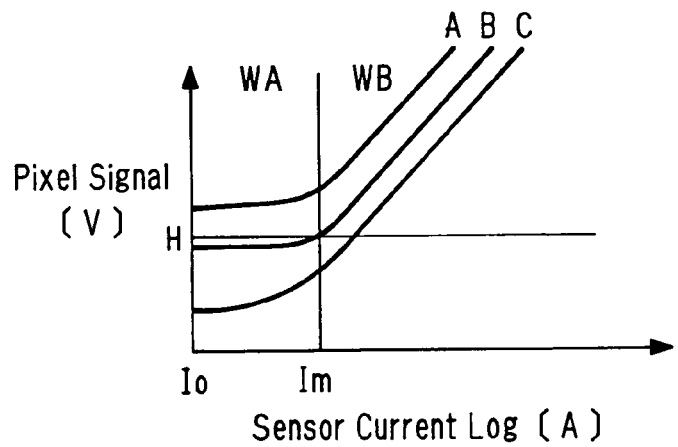
FIG. 20 shows another example of variations in output characteristics of pixel signals of an image sensor, which variations were derived from the structure of respective pixel circuits of an image sensor.

FIG. 20 shows another example of different output characteristics of three pixel signals A, B and C which may be resulted from the structure-derived variations of corresponding light sensor circuits.

Figure 19:
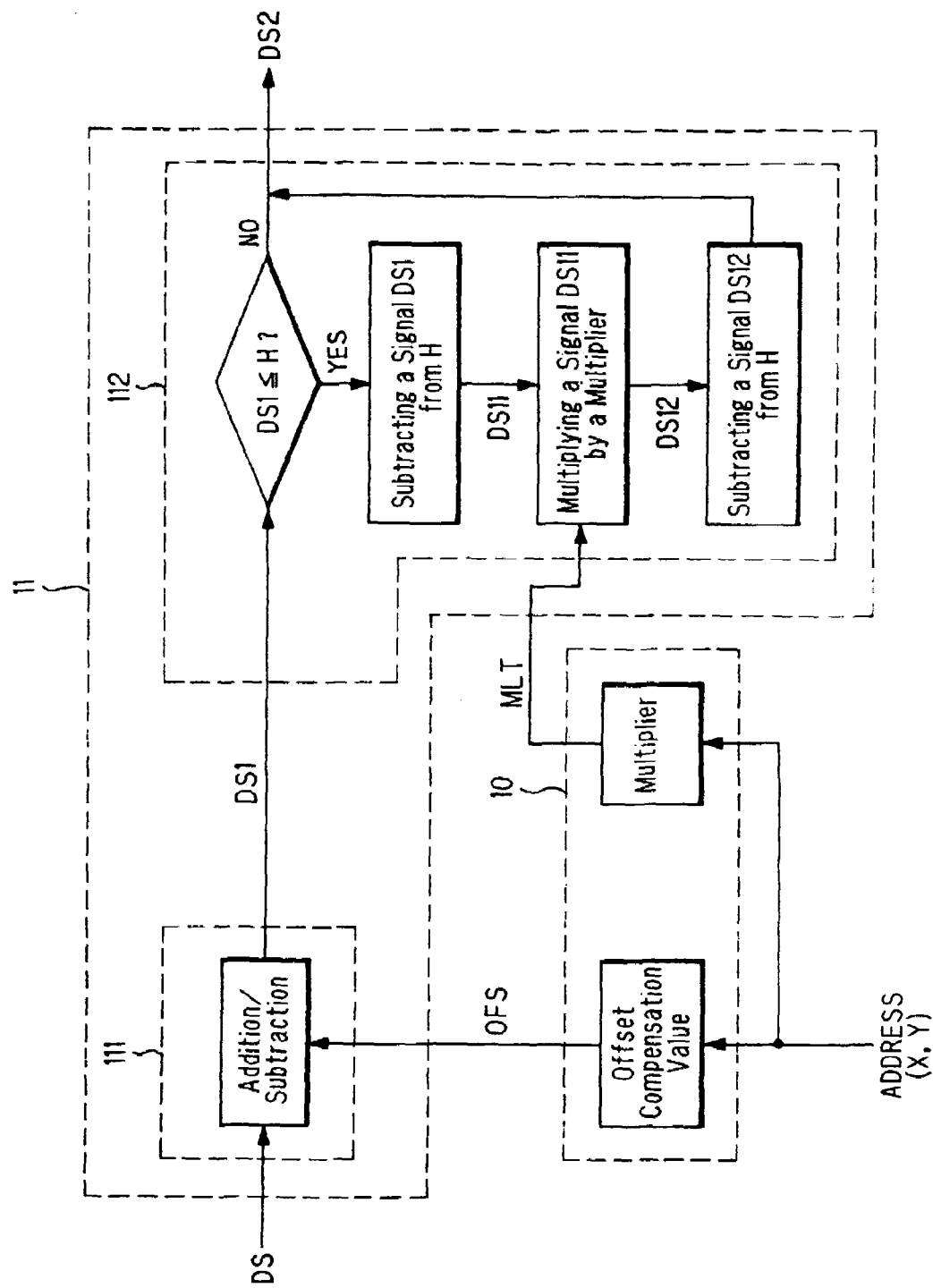
FIG. 19 is another exemplary flowchart depicting the operation of an output compensating circuit of an output compensating device shown in FIG. 6.

FIG. 19 illustrates the operation of the output compensating circuit 11.

Figure 21:
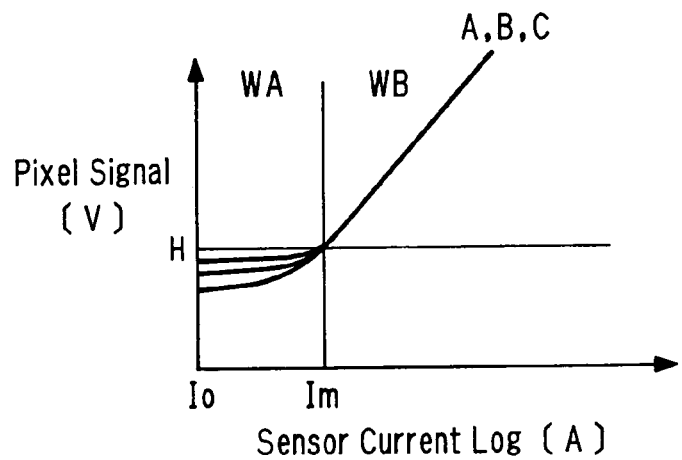
FIG. 21 shows output characteristics of pixel signals, which were obtained by offset compensation of the signals having the output characteristics shown in FIG. 20.

A memory 10 holds an offset-compensation value OFS preset for obtaining a pixel output of H at a sensor current value Im. In an offset compensating portion 111, the offset compensation of each digitized pixel signal DS is conducted by arithmetic operations (addition, subtraction) using the offset compensation value OFS. As the result of the offset compensation, three pixel signals (A, B and C) have the same characteristic in the logarithmic response region WB as shown in FIG. 21.

In a gain compensating portion 112, the gain compensation for variations in characteristics of three pixel signals in the non-logarithmic response region WA below the threshold value H is conducted by arithmetic operations (multiplication) by using corresponding multipliers and the offset compensated signals DS1.

In practice, the offset-compensated pixel signal DS1 is checked whether it is smaller than the threshold value H and, if so (i.e., it lies in the non-logarithmic response region WA), it is further subjected to the gain compensation by the following arithmetic operations using a specified multiplier MLT selected from the memory 10.

Output←H−(H−Pixel Signal DS1)×Multiplier

A result signal is output as digital output-compensated pixel signal DS2.

Figure 22:
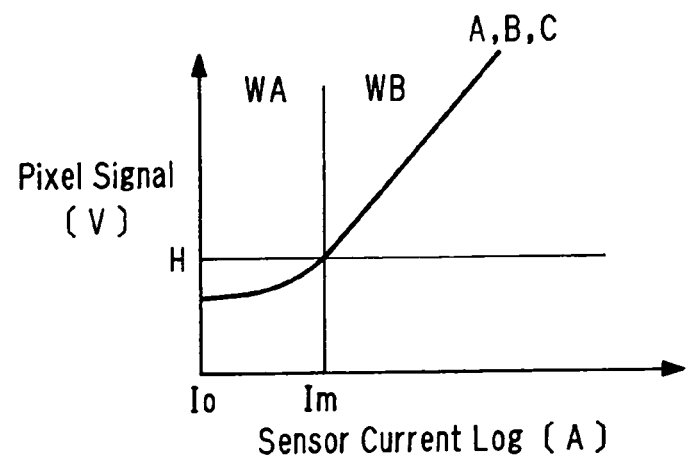
FIG. 22 shows output characteristics of pixel signals, which were obtained by offset compensation and gain compensation of the signals having the output characteristics shown in FIG. 20.

As the result of gain compensation, three pixel signals A, B and C have the same characteristics in the non-logarithmic response region WA as shown in FIG. 22. In this instance, when the offset-compensated pixel signal DS1 is larger than the threshold value (i.e., in the logarithmic response region WB) is directly output as a digital output-compensated pixel signal DS2.

Figure 24:
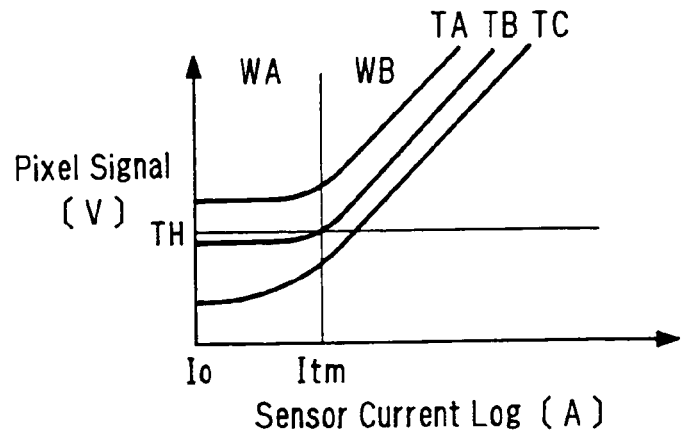
FIG. 24 shows another example of variations in output characteristics of pixel signals from an image sensor, which variations may be caused from variations in temperature characteristic of respective light sensor circuits.

FIG. 24 shows another example of different output characteristics of three pixel signals TA, TB and TC at corresponding temperatures.

According to the present invention, the compensation of output signals of the image sensor is normally conducted when the output characteristics of respective pixel signals have substantially the same gradient in the logarithmic response region WB and different shapes in the non-logarithmic response region WA.

Figure 23:
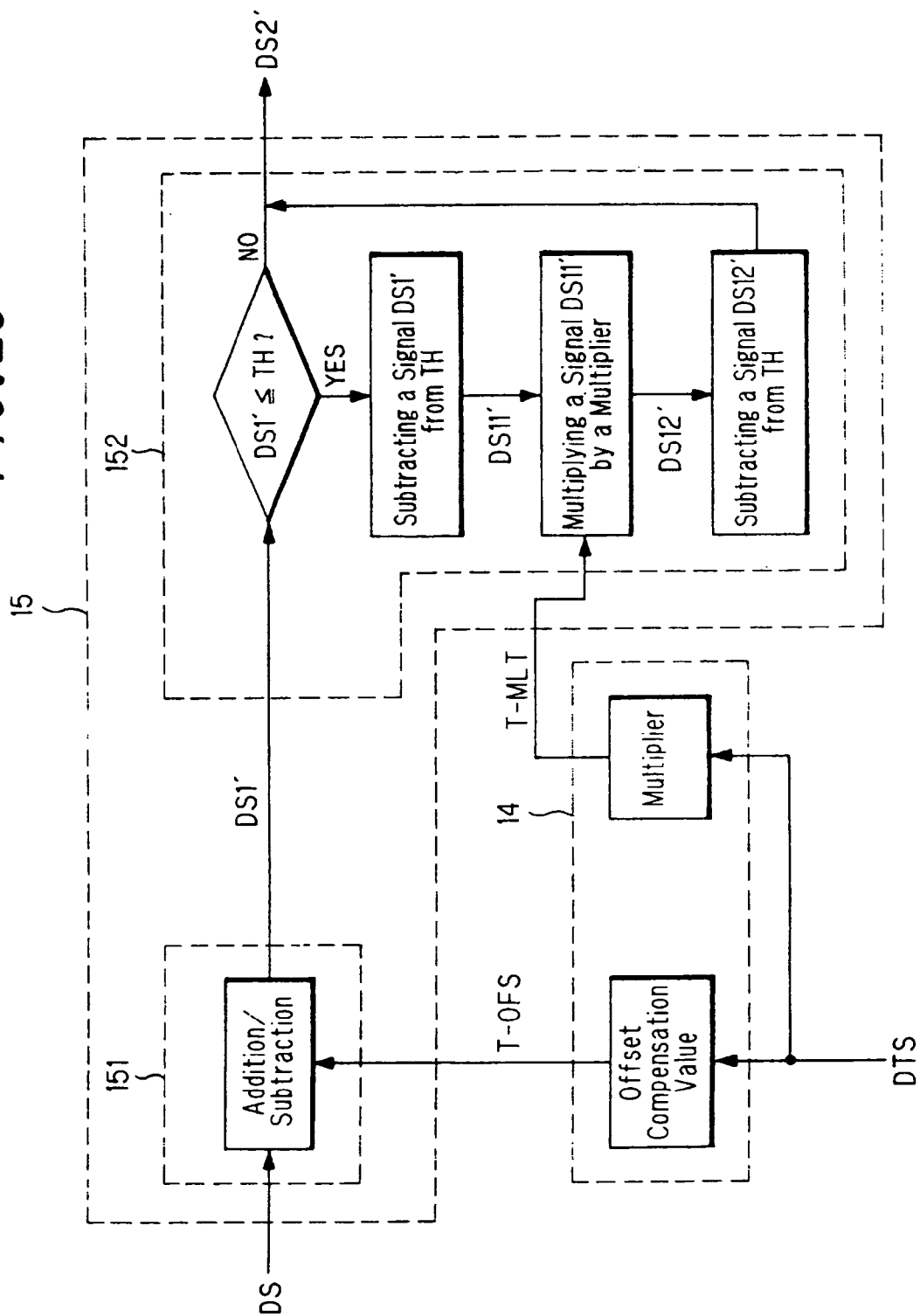
FIG. 23 is another exemplary flowchart depicting the operation of the output compensation device of FIG. 11.

FIG. 23 illustrates the operation of the output compensating circuit 15 in the above-mentioned case.

Figure 25:
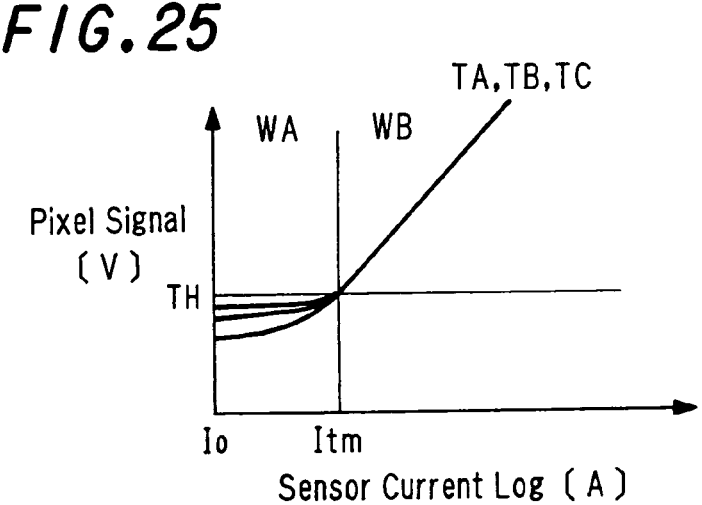
FIG. 25 shows output pixel signal characteristics obtained by offset compensation of temperature characteristics of the signals having the output characteristics shown in FIG. 24.

The memory 14 holds an offset-compensation value T-OFS preset for obtaining a pixel output of TH at a sensor current value Itm. In an offset compensating portion 151, the digitized pixel signals DS are offset compensated by arithmetic operations (addition, subtraction) using the offset compensation values T-OFS. As the result of the offset compensation, three pixel signals TA, TB and TC at corresponding temperatures have the same characteristics in the logarithmic response region WB as shown in FIG. 25.

In a gain compensating portion 152, the gain compensation for variations in characteristics of three pixel signals in the non-logarithmic response region WA below the threshold value TH is conducted by arithmetic operations (multiplication) using corresponding multipliers and the offset compensated signal DS1′.

In practice, the offset-compensated pixel signal DS1′ is examined whether it is smaller than the threshold value TH and, if so, it is further processed by the gain compensation by the following arithmetic operations using a specified multiplier T-MLT selected from the memory 14.

Output←TH−(TH−Pixel Signal DS1′)×Multiplier

A result signal is output as an output-compensated digital pixel signal DS2′.

Figure 26:
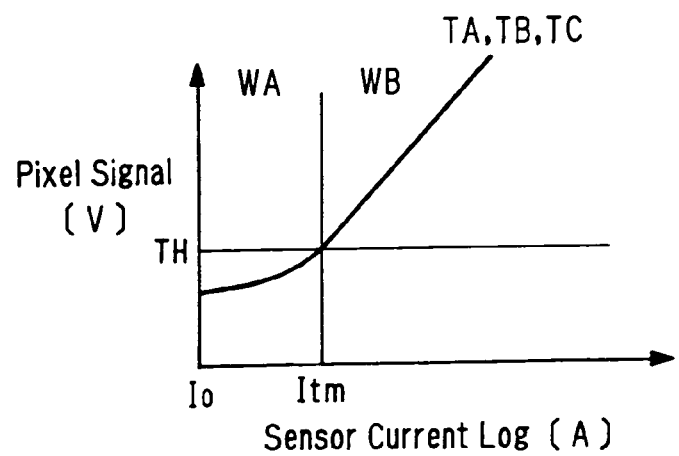
FIG. 26 shows output characteristics of pixel signals obtained by offset compensation and gain compensation of temperature characteristics of the signals having the output characteristics shown in FIG. 24.

As the result of the gain compensation, three pixel signals TA, TB and TC with corresponding temperatures have the same characteristics in the non-logarithmic response region WA as shown in FIG. 26. In this instance, when the offset-compensated pixel signal DS1′ is larger than the threshold value TH is directly outputted as an offset-compensated digital pixel signal DS2′.

Figure 27:
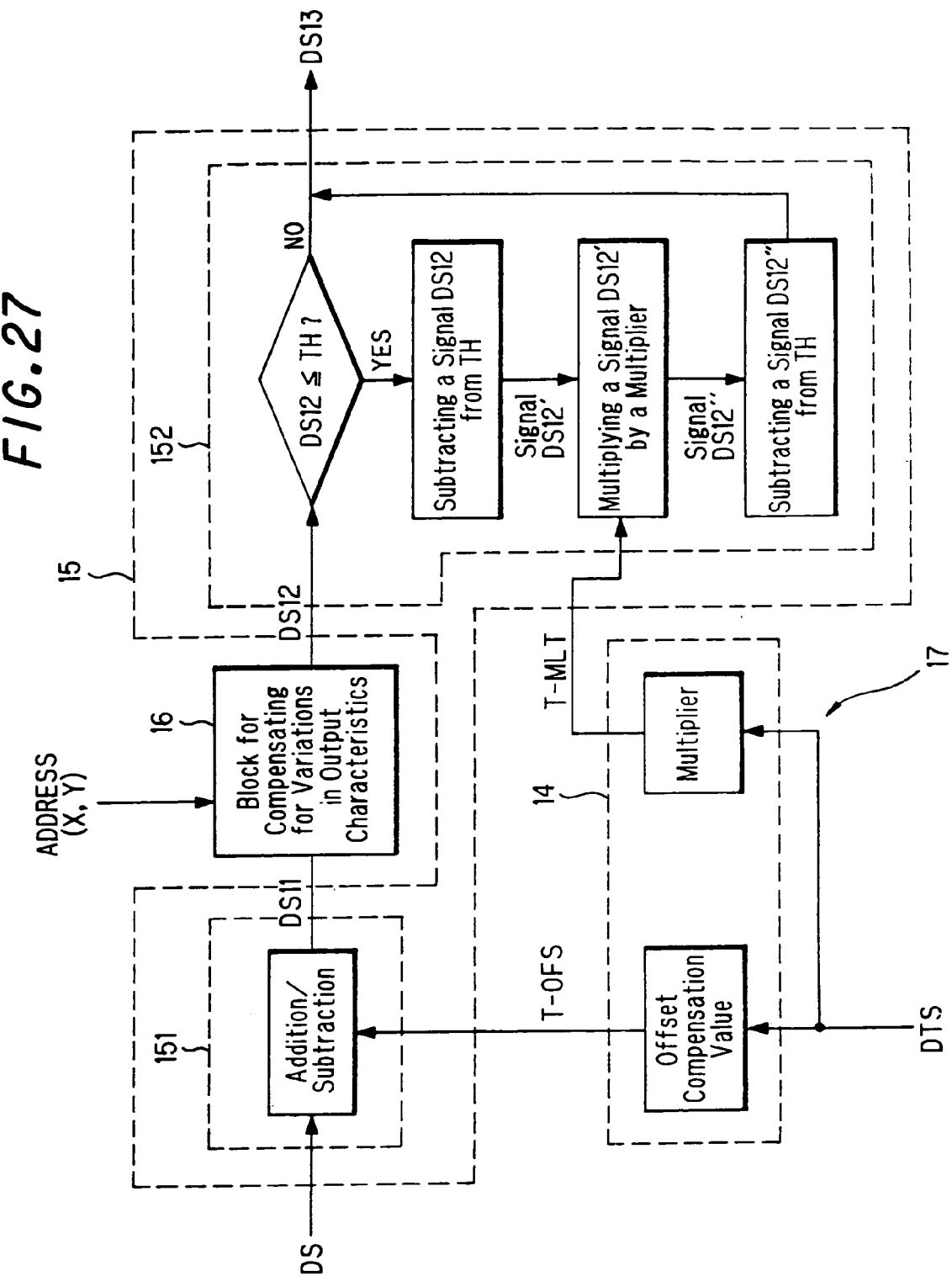
FIG. 27 is another exemplary flowchart depicting the operation of an output compensation device for compensating for variations in output characteristics and temperature characteristics of respective light sensor circuits of an image sensor.

FIG. 27 shows a procedure for conducting the offset-compensation of a pixel signal for a variation in its temperature characteristic, the offset and gain compensation for a structure-derived variation in its output characteristic and the offset and gain compensations for a variation in its temperature characteristic in the described order.

In this case, a pixel signal DS output from the image sensor 7 is digitized and transferred to an offset compensation block 151 on the side of the temperature characteristic compensation processing block 17, whereby the pixel signal is compensated for a variation in its temperature characteristic to attain a correct level H necessary for compensating for a variation in the output characteristics of the pixel signal. The offset-compensated pixel signal DS11 is transferred to the processing block 16, whereby the signal is adaptively compensated for its output characteristic variation by the offset and gain compensations. The offset- and gain-compensated pixel signal DS12 from the processing block 16 is then transferred to a gain compensating portion 152 on the side of processing block 17, whereby the signal is subjected to the gain compensation for its temperature characteristic variation. Finally, a pixel signal DS13 compensated for both kinds of characteristic variations is obtained.

Figure 28:
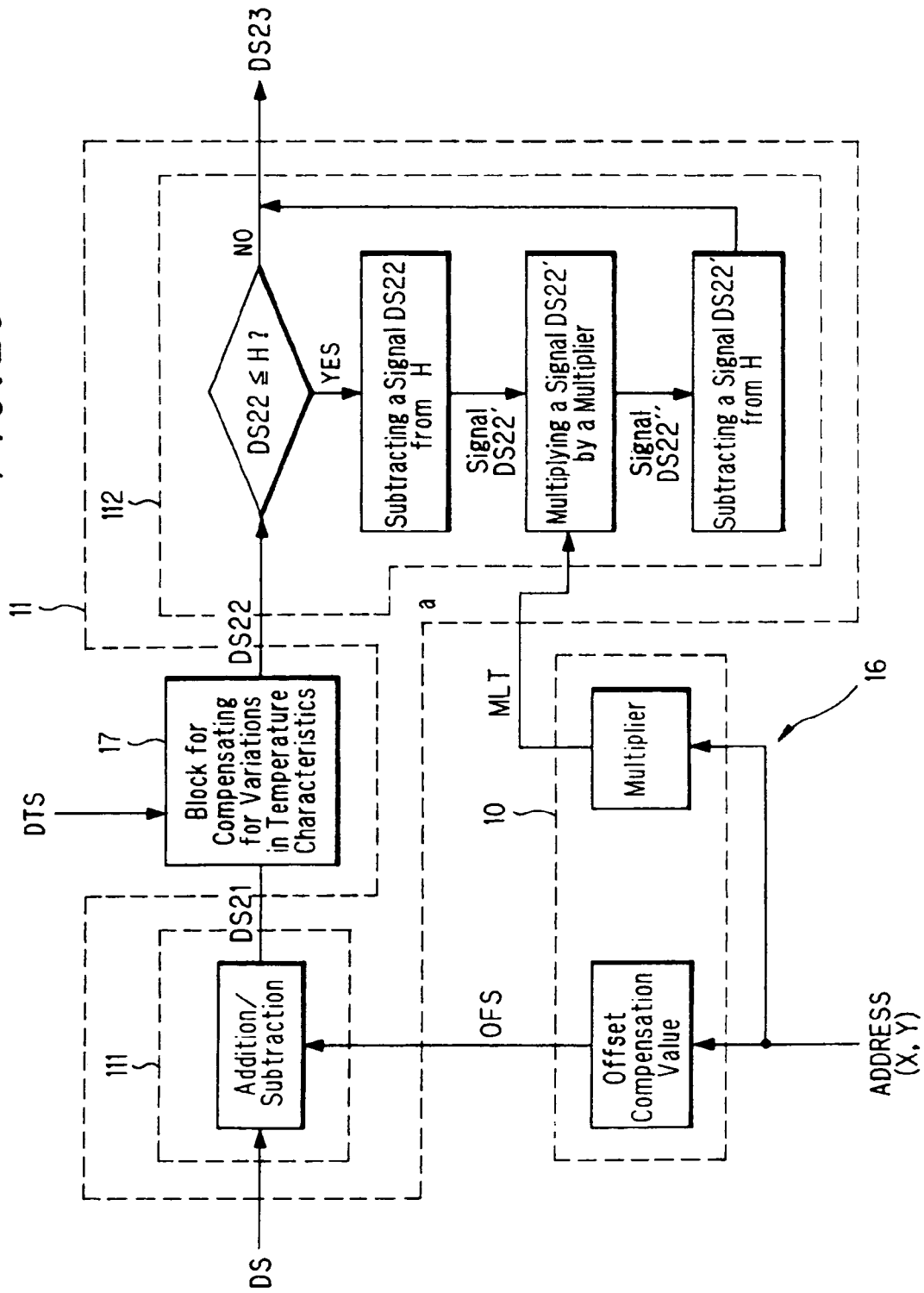
FIG. 28 is a further exemplary flowchart depicting the operation of an output compensation device for compensating for variations in output characteristics and temperature characteristics of respective light sensor circuits of an image sensor.

FIG. 28 shows a procedure for conducting the offset compensation of a pixel signal for a structure-derived variation in its output characteristic, the offset and gain compensations for a variation in its temperature characteristic and then the offset and gain compensations for variation in its output characteristic.

In this instance, a pixel signal DS from the image sensor 7 is digitized and transferred to an offset compensating portion 111 on the side of the output characteristic compensating block 16, whereby the pixel signal is subjected to the offset compensation for a variation in its output characteristic to attain a correct level TH necessary for compensating for a variation in the temperature characteristic of the same pixel signal. The offset-compensated pixel signal DS21 is transferred to the processing block 17, whereby it is adaptively processed by conducting the offset and gain compensations for a variation in its temperature characteristic. The compensated pixel signal DS22 from the block 17 is transferred to a gain compensating portion 112 on the side of the processing block 16, whereby the signal is further subjected to the gain compensation for a variation in its output characteristic. Finally, a pixel signal DS23 compensated for both kinds of characteristic variations is obtained.

With a high speed video camera according to the present invention, a high speed phenomenon is captured by using an image sensor capable of compensating for variations in output characteristics of respective pixels (light sensor circuits), wherein data of sequential images (frames) taken by the image sensor from the phenomenon (fast varying subject) is stored temporally on a high speed memory and then read out from the memory to present the images on a display for analysis on the phenomenon.

Figure 29:
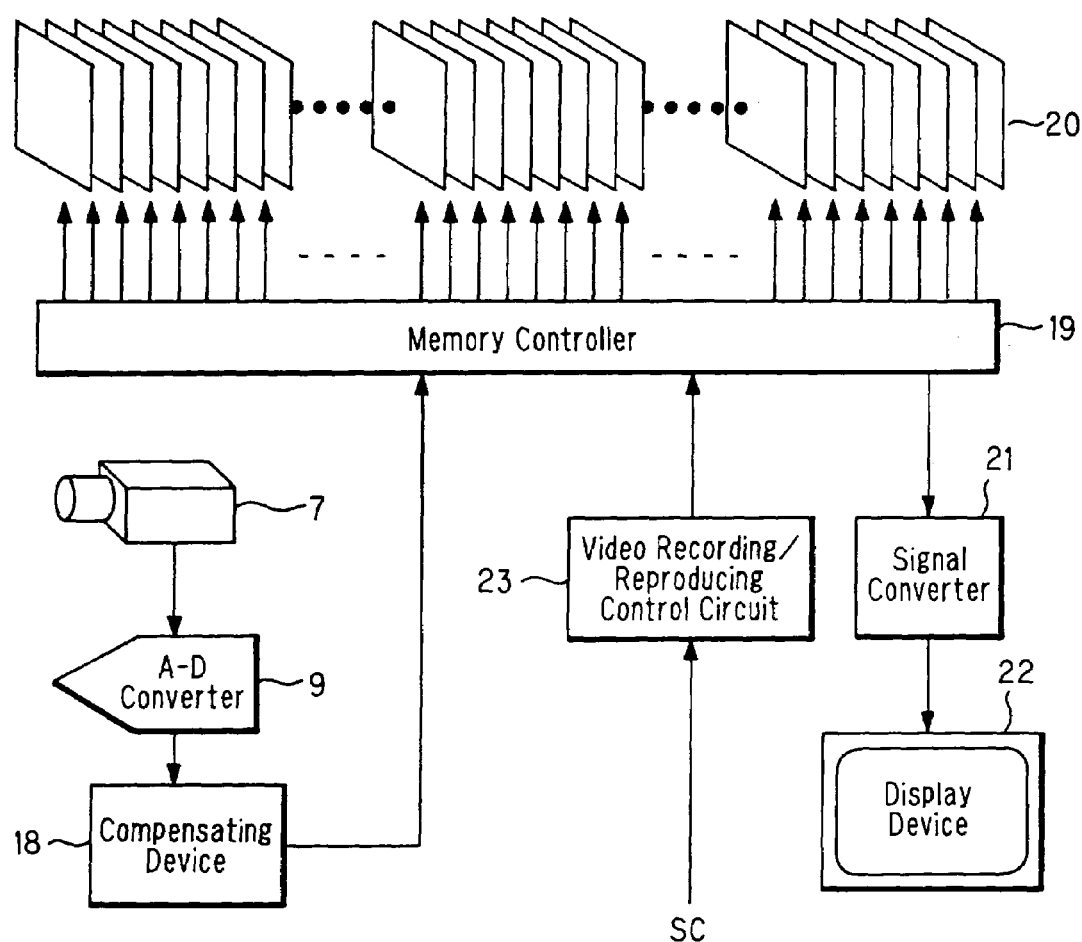
FIG. 29 is a general block construction diagram of a high speed video camera.
Figure 30:
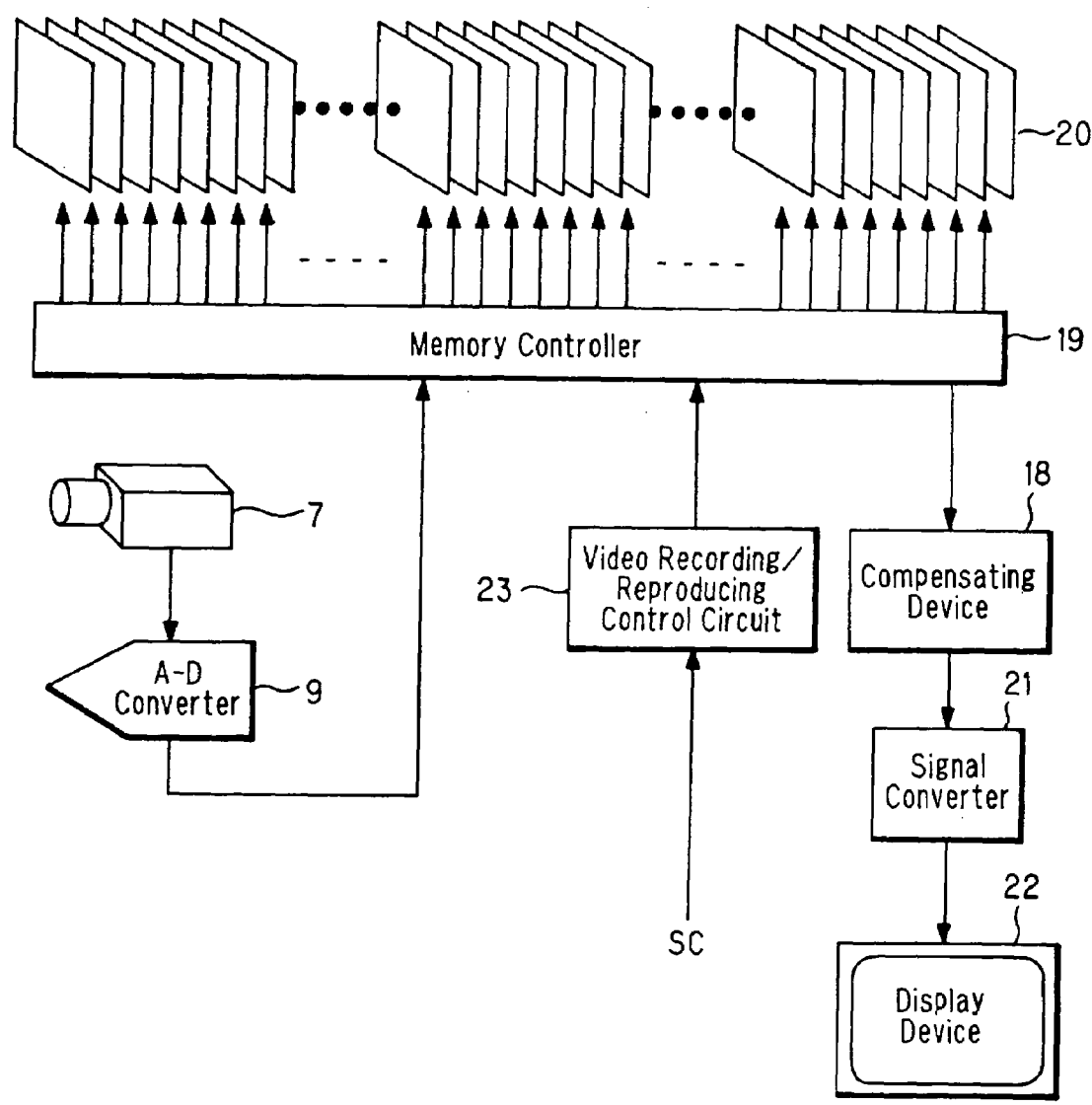
FIG. 30 is a block construction diagram of a high speed video camera according to another embodiment of the present invention.

In this instance, if the image data outputted in a time series by the image sensor 7 is, as shown in FIG. 29, converted by an A-D converter 9 into digital signals, compensated for variations in output characteristics of respective pixels by a compensating device 18 and then successively stored on a frame memory (or a buffer memory) 20 under the control of a memory controller 19, it is necessary to perform the compensation by the compensating device at a very high speed to follow the high speed phenomenon captured by the image sensor. The high speed video camera 7 according to the present invention uses a compensating device 18 composed of components shown in FIG. 6 and 11 excepting an image sensor 7 and an A-D converter 9. In an embodiment according to the present invention, as shown in FIG. 30, image signals outputted from an image sensor 7 are stored directly (i.e., with no compensation) on a frame memory 20. Pixel signals once stored on the frame memory 20 are successively read from the memory 20 under the control of a memory controller 19, compensated for variations of output characteristics of respective pixel circuits in a compensating device 18, and converted by a signal converter 21 into an image signal which is then displayed on a display device 22. In FIG. 30, numeral 23 designates a video recording/reproducing control circuit which provides the memory controller 19 with a control signal for changing-over to storing an image signal on the memory or reading an image signal from the memory according to an external switching command SC for changing over the operating mode from recording to reproducing or the reverse.

In the above described construction, a sequence of images taken from the high speed phenomenon by the image sensor 7 can be stored on the frame memory 20 in real time following the high-speed phenomenon. When reproducing the recorded image signals, the compensation of each image sensor signal for output characteristic variations of respective pixels (sensor circuits) can be conducted at a normal processing speed (with no need of following the high speed of taking images by the image sensor) by reading the image signal data from the frame memory 20 in accordance with a frame rate of the display device 22. For example, a moment of collision of an automobile with an obstruction in the collision experiment was captured by the image sensor 7 by taking a sequence of images at a frame rate of 60 to 80 frames per millisecond and storing the image data on the high speed frame memory 20. The stored images are read successively from the frame memory 20 at a frame speed (1/30 or 1/60 sec.) adapted to the display device and presented on the display screen.

Figure 31:
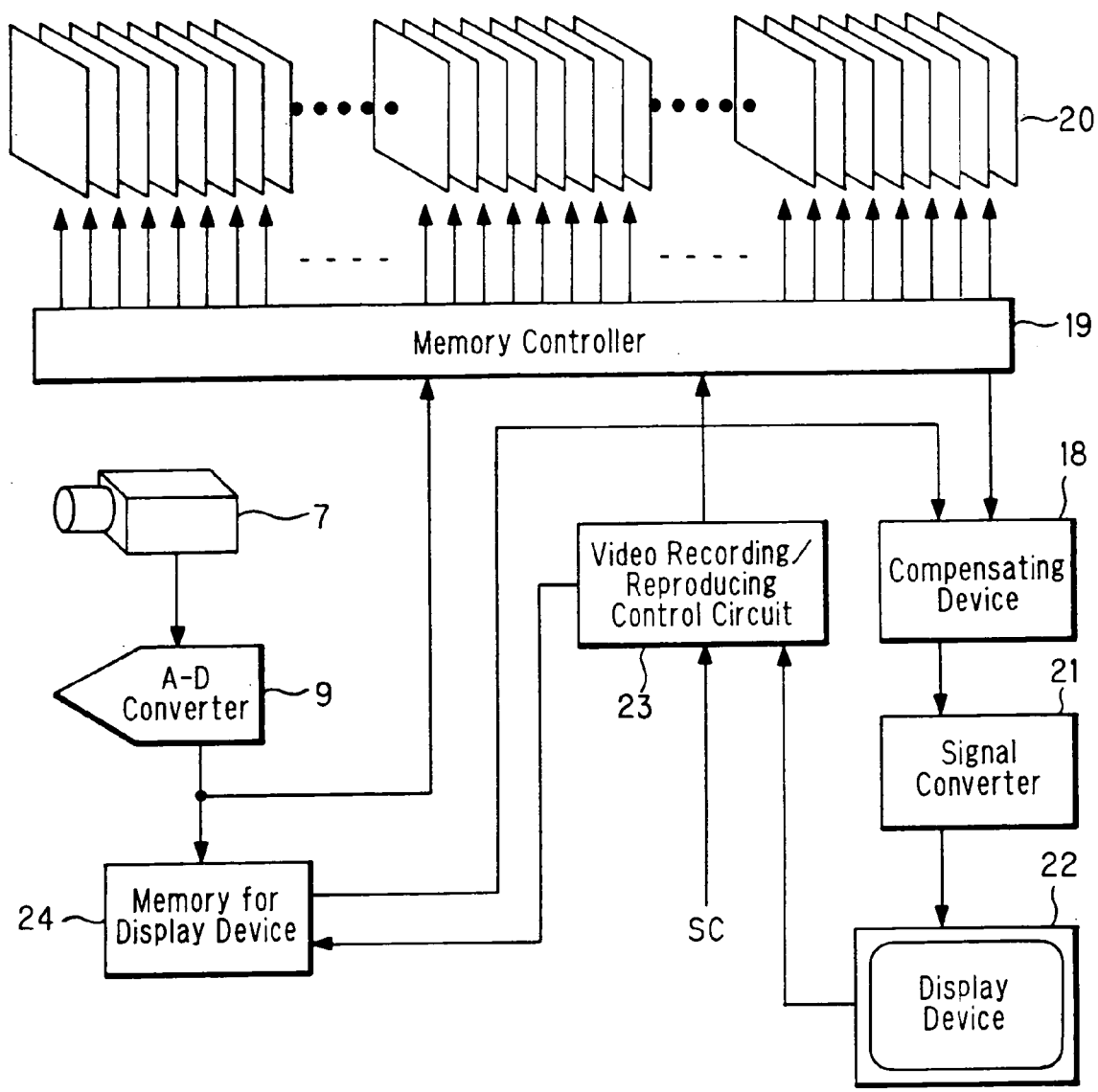
FIG. 31 is a block construction diagram of a high speed video camera according to still another embodiment of the present invention.

FIG. 31 shows a high speed video camera according to another embodiment of the present invention.

Images of a high speed phenomenon taken and recorded at a high speed through an image sensor 7 on the high speed memory cannot be monitored on a display screen because the frame rate of the camera 7 (image sensor) differs from that of a display device 22. Therefore, the shown embodiment is provided with a separate memory 24 for recording thereon the image data from the image sensor at a frame rate adapted to the display device under the control of the recording/reproducing control circuit 23. The stored image data is then read from the memory 24, compensated for variations in output characteristics of the sensor circuits by a compensating device 18 and then provided to the display device which can present successively images of the high speed phenomenon on its screen.

The memory 24 stores a frame image signal extracted at specified timing, which is then updated. This enables the output compensating device 18 to compensate the sensor signal read from the memory 24 at a normal processing speed with no need to follow a high speed of capturing the phenomenon. If the frame rate of the image sensor 7 taking sequential images of a high speed phenomenon is not a multiple of a frame rate of the display device, then images (frames) are extracted with a skip at timings close to the frame rate of the display and stored on the memory 24. This enables the display device 22 to simultaneously present a sequence of images being taken by the image sensor 7, thereby allowing the user to monitor in real time the state of visualizing the high speed phenomenon.

It is also possible for the frame memory 20 to have an area reserved for storing image signals in accordance with the frame rate of the display device, thereby omitting the need of providing the separate memory 24.

Figure 32:
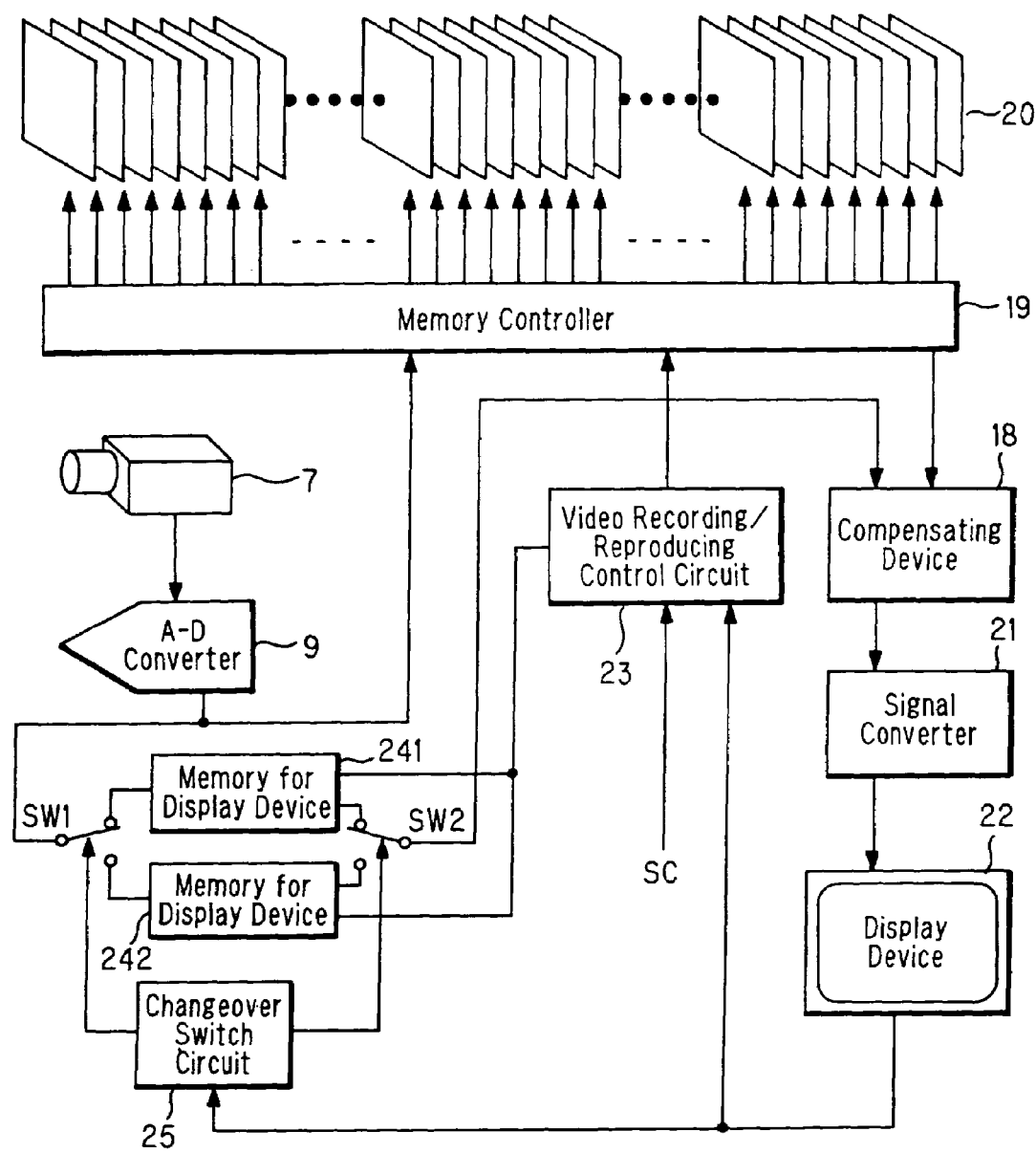
FIG. 32 is a block construction diagram of a high speed video camera according to a further embodiment of the present invention.

FIG. 32 shows another embodiment of the present invention, which is provided with a display device 22 capable of selectively switching a frame rate from 1/30 seconds to 1/60 seconds and the reverse and also provided with two corresponding memories 241 and 242 which are selectively used for storing image signals to be displayed at a frame rate of 1/30 seconds and a frame rate of 1/60 seconds respectively and each of which is selected by a memory selecting switch SW1 or SW2 of a switching circuit 25 in accordance with a frame rate selecting signal provided from the display device 22. Recording an image signal on a selected memory 241 or 242 is conducted under the control of a recording/reproducing control circuit 23 according to the frame rate selecting signal received from the display device 22.

INDUSTRIAL APPLICABILITY OF THE INVENTION

As is apparent from the foregoing, a high speed video camera according to an aspect of the present invention is capable of capturing any high speed phenomenon by an image sensor using MOS type light sensor (pixel) circuits featured by a wide dynamic range with the least occurrence of afterglow of pixels, recording data of images taken from the high speed phenomenon through the image sensor on a high speed memory, conducting compensation of each image sensor signal read from the memory for variations in output characteristics of respective pixel circuits based on the read-out image data and displaying a sequence of images of the phenomenon on a display device according to the compensated image data. In other words, the high speed video camera can take video from the high speed phenomenon by its image sensor and at the same time record the video data on its memory following the high speed phenomenon while conducting compensation for variations in the image sensor outputs with ease at a normal processing speed by reading the stored image signals from the memory. This is a great advantage of the video camera for correctly visualizing high speed phenomena.

A high speed video camera according to another aspect of the present invention is capable of storing data of images of a high speed phenomenon taken by an image sensor on a separate memory at a speed adapted to a frame rate of a display device, compensating for variations in outputs of the image sensor by reading the image data stored in the separate memory, reproducing and displaying images of the phenomenon according to the compensated image data, thus enabling the user of the camera to visually monitor the phenomenon in real time on the display device.

What is claimed is:

1. A high speed video camera for taking video of high speed phenomena, comprising:

an image sensor composed of a number of light sensor circuits each representing a unit pixel and capable of producing in a photoelectric converting element a sensor current proportional to a quantity of light falling thereon and converting the current into a voltage signal by a MOS type transistor with a logarithmic output characteristic in a weak inverse state and including a means for removing a charge accumulated in a parasitic capacitor of the photoelectric converting element by changing a drain voltage of the transistor to a value lower than a normal value for a specified period to initialize each pixel before detecting a light signal;

a memory for storing therein image data output from the image sensor at a high speed;

a compensating circuit for compensating for variations in respective pixel signals from the image sensor by using compensation values predetermined for output characteristics of the respective pixels based on the image data read from the memory; and a display device for displaying an image based on the compensated image data.

2. A high speed video camera as defined in claim 1, characterized in that it is provided with a memory for storing image data output from the image sensor by recording thereon the image data at a speed corresponding to a frame rate of the display device, the compensating device compensates for variations in each pixel signal from the image sensor based on the image data read from the memory and means for displaying an image based on the compensated image data on the display device.

* * * * *